United States Patent
Ono et al.

(10) Patent No.: US 8,934,134 B2
(45) Date of Patent: Jan. 13, 2015

(54) IMAGE PROCESSING BASED ON PIXEL AND ATTRIBUTE VALUES

(75) Inventors: Mitsuhiro Ono, Tokyo (JP); Akitoshi Yamada, Yokohama (JP); Fumitaka Goto, Tokyo (JP); Rie Kajihara, Minoo (JP)

(73) Assignee: Canon Kabushiki Kaisha, Tokyo (JP)

( * ) Notice: Subject to any disclaimer, the term of this patent is extended or adjusted under 35 U.S.C. 154(b) by 306 days.

(21) Appl. No.: 12/818,139

(22) Filed: Jun. 17, 2010

(65) Prior Publication Data
US 2011/0141499 A1 Jun. 16, 2011

(30) Foreign Application Priority Data
Jul. 2, 2009 (JP) .................. 2009-158194

(51) Int. Cl.
H04N 1/60 (2006.01)
H04N 1/32 (2006.01)
(52) U.S. Cl.
CPC ......... *H04N 1/6072* (2013.01); *H04N 1/32561* (2013.01); *H04N 2201/0094* (2013.01)
USPC .............. 358/1.9; 358/1.5; 358/2.1; 358/3.23
(58) Field of Classification Search
CPC .. H04N 7/26085; H04N 7/3027; H04N 7/502
USPC ................................. 358/1.1–3.29
See application file for complete search history.

(56) References Cited

U.S. PATENT DOCUMENTS

| | | | |
|---|---|---|---|
| 6,122,076 A | 9/2000 | Shiota | |
| 6,577,751 B2 | 6/2003 | Yamamoto | |
| 6,788,434 B1 | 9/2004 | Kanematsu et al. | |
| 7,274,478 B2 | 9/2007 | Oshima et al. | |
| 7,277,198 B2 | 10/2007 | Kawanabe et al. | |
| 7,430,054 B2 | 9/2008 | Masumoto et al. | |

(Continued)

FOREIGN PATENT DOCUMENTS

| | | |
|---|---|---|
| JP | 09-018704 A | 1/1997 |
| JP | 11-355591 A | 12/1999 |

(Continued)

OTHER PUBLICATIONS

U.S. Appl. No. 12/819,103, filed Jun. 18, 2010, Kajihara et al.

(Continued)

*Primary Examiner* — Benny Q Tieu
*Assistant Examiner* — Marcellus Augustin
(74) *Attorney, Agent, or Firm* — Fitzpatrick, Cella, Harper & Scinto

(57) ABSTRACT

An image processing device processes image data, which is edited to image data including, in correspondence with each pixel of an object included in the image, a pixel value field that holds a pixel value of the pixel and an attribute value field that holds an attribute value. The image processing device includes a generation unit which includes a table that holds characteristic data and an address of the characteristics data, generates an attribute value based on information of a position of a pixel in the image and the table, sets the attribute value in the attribute value field, an image processing unit which applies an image process to a pixel value set in the pixel value field based on the set attribute value, and a connection module moves the image data from the generation unit to the image processing unit.

19 Claims, 15 Drawing Sheets

(56) References Cited

U.S. PATENT DOCUMENTS

| | | |
|---|---|---|
| 7,440,612 B2 | 10/2008 | Ogata et al. |
| 7,800,784 B2 | 9/2010 | Kawanabe et al. |
| 2002/0122198 A1 | 9/2002 | Tsue et al. |
| 2003/0228067 A1 | 12/2003 | Miyake et al. |
| 2004/0175054 A1 | 9/2004 | Ogata et al. |
| 2004/0223185 A1 | 11/2004 | Yamada et al. |
| 2005/0036160 A1 | 2/2005 | Goto et al. |
| 2005/0128528 A1 | 6/2005 | Yamada et al. |
| 2006/0132874 A1 | 6/2006 | Ishikawa |
| 2006/0173904 A1* | 8/2006 | Nakajima .................... 707/102 |
| 2006/0279801 A1 | 12/2006 | Nagai |
| 2007/0201095 A1 | 8/2007 | Kawanabe et al. |
| 2008/0028151 A1* | 1/2008 | Hino ........................... 711/125 |
| 2008/0049238 A1* | 2/2008 | Nagarajan et al. ............. 358/1.9 |
| 2008/0247677 A1* | 10/2008 | Yoshino ....................... 382/305 |
| 2008/0309961 A1 | 12/2008 | Aichi et al. |

FOREIGN PATENT DOCUMENTS

| | | |
|---|---|---|
| JP | 2000-156872 A | 6/2000 |
| JP | 2002-077623 A | 3/2002 |
| JP | 2004-015322 A | 1/2004 |
| JP | 2006-178546 A | 7/2006 |
| JP | 2006-341446 A | 12/2006 |
| JP | 2007-124233 A | 5/2007 |

OTHER PUBLICATIONS

U.S. Appl. No. 12/818,143, filed Jun. 17, 2010, Yamada, et al.
U.S. Appl. No. 12/818,133, filed Jun. 17, 2010, Yamada, et al.

\* cited by examiner

F I G. 4
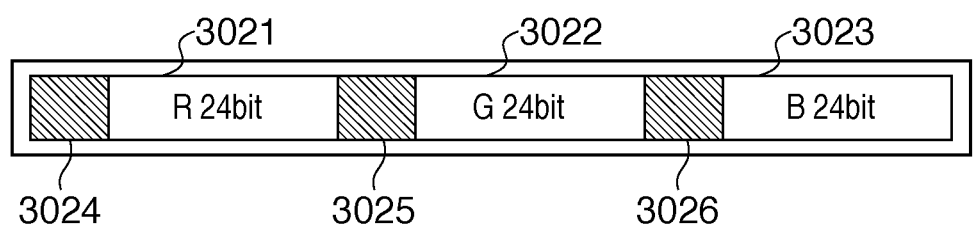

F I G. 6

| | | | | | | | | | | | | | | | | |
|---|---|---|---|---|---|---|---|---|---|---|---|---|---|---|---|---|
| 0x00 | 0 | 1 | 0 | 1 | 0 | 1 | 0 | 1 | 0 | 1 | 0 | 1 | 0 | 1 | 0 | 1 |
| 0x01 | 0 | 1 | 0 | 1 | 0 | 1 | 0 | 1 | 0 | 1 | 0 | 1 | 0 | 1 | 0 | 1 |
| 0x02 | 0 | 1 | 0 | 1 | 0 | 1 | 0 | 1 | 0 | 1 | 0 | 1 | 0 | 1 | 0 | 1 |
| 0x03 | 0 | 1 | 0 | 1 | 0 | 1 | 0 | 1 | 0 | 1 | 0 | 1 | 0 | 1 | 0 | 1 |
| 0x04 | 0 | 1 | 0 | 1 | 0 | 1 | 0 | 1 | 0 | 1 | 0 | 1 | 0 | 1 | 0 | 1 |
| 0x05 | 0 | 1 | 0 | 1 | 0 | 1 | 0 | 1 | 0 | 1 | 0 | 1 | 0 | 1 | 0 | 1 |
| 0x06 | 0 | 1 | 0 | 1 | 0 | 1 | 0 | 1 | 0 | 1 | 0 | 1 | 0 | 1 | 0 | 1 |
| 0x07 | 0 | 1 | 0 | 1 | 0 | 1 | 0 | 1 | 0 | 1 | 0 | 1 | 0 | 1 | 0 | 1 |
| 0x08 | 0 | 1 | 0 | 1 | 0 | 1 | 0 | 1 | 0 | 1 | 0 | 1 | 0 | 1 | 0 | 1 |
| 0x09 | 0 | 1 | 0 | 1 | 0 | 1 | 0 | 1 | 0 | 1 | 0 | 1 | 0 | 1 | 0 | 1 |
| 0x0A | 0 | 1 | 0 | 1 | 0 | 1 | 0 | 1 | 0 | 1 | 0 | 1 | 0 | 1 | 0 | 1 |
| 0x0B | 0 | 1 | 0 | 1 | 0 | 1 | 0 | 1 | 0 | 1 | 0 | 1 | 0 | 1 | 0 | 1 |

Rows 0x00–0x0B: INDEX TABLE

| | |
|---|---|
| 0x0C | 0x000A |
| 0x0D | 0x000B |
| 0x0E | 0x000C |
| 0x0F | 0x000D |

Rows 0x0C–0x0F: DATA TABLE

| | | | | | | | | |
|---|---|---|---|---|---|---|---|---|
| 0x00 | 0 | 1 | 2 | 3 | 0 | 1 | 2 | 3 |
| 0x01 | 0 | 1 | 2 | 3 | 0 | 1 | 2 | 3 |
| 0x02 | 0 | 1 | 2 | 3 | 0 | 1 | 2 | 3 |
| 0x03 | 0 | 1 | 2 | 3 | 0 | 1 | 2 | 3 |
| 0x04 | 0 | 1 | 2 | 3 | 0 | 1 | 2 | 3 |
| 0x05 | 0 | 1 | 2 | 3 | 0 | 1 | 2 | 3 |
| 0x06 | 0 | 1 | 2 | 3 | 0 | 1 | 2 | 3 |
| 0x07 | 0 | 1 | 2 | 3 | 0 | 1 | 2 | 3 |

} INDEX TABLE

| | |
|---|---|
| 0x08 | 0x00 |
| 0x09 | 0x01 |
| 0x0A | 0x02 |
| 0x0B | 0x03 |
| 0x0C | 0x04 |
| 0x0D | 0x05 |
| 0x0E | 0x06 |
| 0x0F | 0x07 |

} DATA TABLE

FIG. 10

| | | | | |
|---|---|---|---|---|
| 0x00 | 0 | 1 | 2 | 3 |
| 0x01 | 4 | 5 | 6 | 7 |
| 0x02 | 8 | 9 | 0 | 1 |
| 0x03 | 2 | 3 | 4 | 5 |
| 0x04 | 6 | 7 | 8 | 9 |
| 0x05 | 0 | 1 | 2 | 3 |

} INDEX TABLE

| | |
|---|---|
| 0x06 | 0x00 |
| 0x07 | 0x01 |
| 0x08 | 0x02 |
| 0x09 | 0x03 |
| 0x0A | 0x04 |
| 0x0B | 0x05 |
| 0x0C | 0x06 |
| 0x0D | 0x07 |
| 0x0E | 0x08 |
| 0x0F | 0x09 |

} DATA TABLE

| 0x00 | 0 | 1 | 1 | 2 | | | | | | | | | | | | } INDEX TABLE |
| 0x01 | 0x0001 (GRAPHIC AREA) | } DATA TABLE |
| 0x02 | 0x0101 (TEXT AREA) | |
| 0x03 | 0x0000 (PHOTO AREA) | |

IMAGE PROCESSING BASED ON PIXEL AND ATTRIBUTE VALUES

BACKGROUND OF THE INVENTION

1. Field of the Invention

The present invention relates to an image processing device and an image processing apparatus.

2. Description of the Related Art

A printing apparatus, which prints information such as characters and images on a printing medium, is known. As a printing system, an ink-jet printing system, which performs printing using inks, is available. In recent years, a multifunction printer, which adopts such ink-jet printing system (to be referred to as an ink-jet multifunction printer hereinafter), has prevailed. As a feature of the ink-jet multifunction printer, a copy process on plain paper and a direct print process on photo paper can be achieved by a single printer.

As a printing speed is increasing, it is required to speed up image processes. The image processes are implemented by hardware or software. The hardware scale and cost essentially have a proportional relationship. In order to reduce a product price while enhancing functions, so as to gain greater customer satisfaction, the processing performance has to be improved while suppressing hardware cost. Hence, a hardware technique, which flexibly changes processes according to specifications and intended purposes, has been proposed (see Japanese Patent Laid-Open No. 2006-178546).

In general, in a copy process, for example, a character modification process is executed. The character modification process is executed to suppress an adverse effect on a halftone dot part due to emphasized edges of a character part. For this reason, in this process, a character area and halftone dot area have to be determined, and image processes suited to the respective areas have to be executed (see Japanese Patent Laid-Open No. 2002-77623).

Upon printing a photo image (so-called photo printing), for example, a dodging process is executed. In dodging, in order to suppress an adverse effect on a background part while maintaining an appropriate lightness level of an object in a backlight state, an object area and remaining area have to be determined, and processes suited to the respective areas have to be executed (see Japanese Patent Laid-Open No. 9-18704). Likewise, even in a red-eye correction process for removing a red eye at the time of flash imaging and a noise reduction process for removing dark part noise at the time of photo imaging, a uniform process is not applied to the entire image. That is, a correction process has to be applied to a specific adverse effect occurrence area while suppressing an adverse effect on a part having good image quality (see Japanese Patent Laid-Open Nos. 11-355591 and 2004-15322).

When the aforementioned image processes (that is, those according to areas) are to be speeded up in the copy process or photo printing process, dedicated circuits for those processes are normally arranged. For this reason, an apparatus, which includes both a copy function and photo printing function like an ink-jet multifunction printer, has to incorporate both the circuits, and cannot avoid an increase in cost.

Furthermore, since the respective circuits are required to execute image processes in parallel according to areas, a heavy processing load is imposed on such data transfer control. For this reason, for example, an access speed drop to a memory occurs.

In order to suppress this memory consumption, for example, an index addressing method or the like may be adopted. However, in case of an apparatus having multiple functions like, for example, a multifunction printer, indices and addresses have to be set to cover all of the plurality of image processing modes in that apparatus, and it is difficult to implement such method.

SUMMARY OF THE INVENTION

The present invention provides a technique that can reduce a load on data transfer control in an arrangement that controls execution of image processes of a plurality of modes by the index addressing method.

According to a first aspect of the present invention there is provided an image processing device for processing image data, which is edited to image data including, in correspondence with each pixel of an object included in the image, a pixel value field that holds a pixel value of the pixel and an attribute value field that holds an attribute value, the device comprising: a generation unit comprising a table which holds characteristic data specified in correspondence with an area assigned in the image and an address of the characteristics data, and configured to generate an attribute value based on information of a position of a pixel in the image and the table, and to set the attribute value in the attribute value field; an image processing unit configured to apply an image process to a pixel value set in the pixel value field based on the attribute value set in the attribute value field; and a connection module connected to the generation unit and the image processing unit, and configured to move the image data from the generation unit to the image processing unit.

According to a second aspect of the present invention there is provided an image processing apparatus comprising: the above-mentioned image processing device; a memory configured to hold the image data processed by the image processing device; and a control unit configured to control the image processing device.

Further features of the present invention will be apparent from the following description of exemplary embodiments with reference to the attached drawings.

BRIEF DESCRIPTION OF THE DRAWINGS

FIG. 4 is a view showing an example of the format of processing image data according to an embodiment;

FIG. 6 is a view showing an example of a reference table;

FIG. 7 is a view of an image in which attribute values are set in correspondence with respective pixels;

FIG. 9 is a view showing an example of a reference table;

FIG. 10 is a view showing an example of a reference table;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Note that the following description will exemplify an image processing apparatus which adopts an ink-jet printing system. However, the present invention is not limited to such specific system. For example, an electrophotography system using toners as color materials may be adopted.

The image processing apparatus may be, for example, a single-function printer having only a printing function, or a multifunction printer having a plurality of functions including a printing function, FAX function, and scanner function. Also, the image processing apparatus may be, for example, a manufacturing apparatus used to manufacture a color filter, electronic device, optical device, micro-structure, and the like using a predetermined printing system.

In this specification, "printing" means not only forming significant information such as characters or graphics but also forming, for example, an image, design, pattern, or structure on a printing medium in a broad sense regardless of whether the formed information is significant, or processing the medium as well. In addition, the formed information need not always be visualized so as to be visually recognized by humans.

Also, a "printing medium" means not only a paper sheet for use in a general printing apparatus but also a member which can fix ink, such as cloth, plastic film, metallic plate, glass, ceramics, resin, lumber, or leather in a broad sense.

Also, "ink" should be interpreted in a broad sense as in the definition of "printing" mentioned above, and means a liquid which can be used to form, for example, an image, design, or pattern, process a printing medium, or perform ink processing upon being supplied onto the printing medium. The ink processing includes, for example, solidification or insolubilization of a coloring material in ink supplied onto a printing medium.

Figure 1:
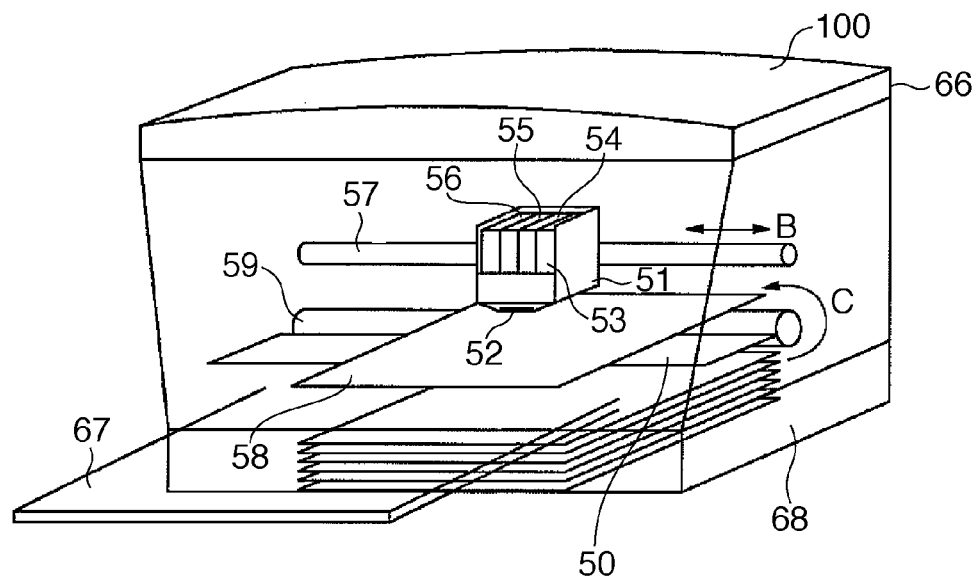
FIG. 1 is a schematic perspective view showing the arrangement of an image processing apparatus 100.

FIG. 1 is a schematic perspective view showing the arrangement of an image processing apparatus 100 according to an embodiment of the present invention.

The image processing apparatus 100 includes, for example, a printing unit, scanning unit, and control unit (not shown). The printing unit incorporates, for example, an ink-jet serial printer, and the scanning unit incorporates, for example, a CCD flatbed scanner.

The scanning unit scans an image formed on a printing medium by optically scanning the printing medium. The scanning unit is normally arranged on an upper portion of the printing unit. The scanning unit includes an upper cover 66 used to press an original. The upper cover 66 is pivotal about hinges (not shown). On the other hand, the printing unit includes a paper discharge unit 67 used to discharge a printed printing medium outside the apparatus, and a paper feed unit 68 which stacks printing media such as printing sheets used in printing.

As shown in FIG. 1, the printing unit includes, for example, a head carriage 51, printhead 52, ink tanks 53 to 56, shaft 57, conveyance roller 59, platen 50, head carriage motor (not shown), and conveyance motor (not shown).

The head carriage 51 mounts, for example, the printhead 52, the ink tank 53 which stores black ink, the ink tank 54 which stores cyan ink, the ink tank 55 which stores magenta ink, and the ink tank 56 which stores yellow ink. The head carriage 51 moves along the shaft 57 in the directions of arrows B.

The printhead 52 adopts, for example, an ink-jet system which discharges ink using a heat energy. The printhead 52 includes printing elements configured by heat generation elements (to be referred to as heaters hereinafter), and heater driving circuits. The heaters are arranged in correspondence with respective nozzles. In the ink-jet printing system using the heat generation elements, a voltage is applied to each heat generation element to heat ink in the vicinity of that heat generation element to instantaneous boiling. Then, an ink droplet is discharged by an abrupt bubble pressure generated by a phase change of the ink at the time of boiling. Note that the ink discharge system is not limited to such specific system. For example, any other systems such as a system using piezo elements, that using electrostatic elements, and that using MEMS elements may be used.

In a printing operation, the image processing apparatus 100 brings in an uppermost printing sheet 58 in the paper feed unit 68 in a U-shape (arrow C) using the conveyance roller 59 and a driving motor. When the leading end of the printing sheet 58 reaches a position below the printhead 52, the head carriage 51 reciprocally moves in the directions of the arrows B, and the printhead 52 discharges ink droplets onto the printing sheet 58. In this way, printing for one scan is done. The image processing apparatus 100 conveys the printing sheet 58 by a length corresponding to one scan using the conveyance roller 59, and controls the head carriage 51 to scan again, thus performing printing. Since this operation is repetitively executed, printing is attained. Upon completion of printing for the printing medium, the image processing apparatus 100 discharges the printing sheet 58 onto the paper discharge unit 67. In this manner, the printing operation ends.

Figure 2:
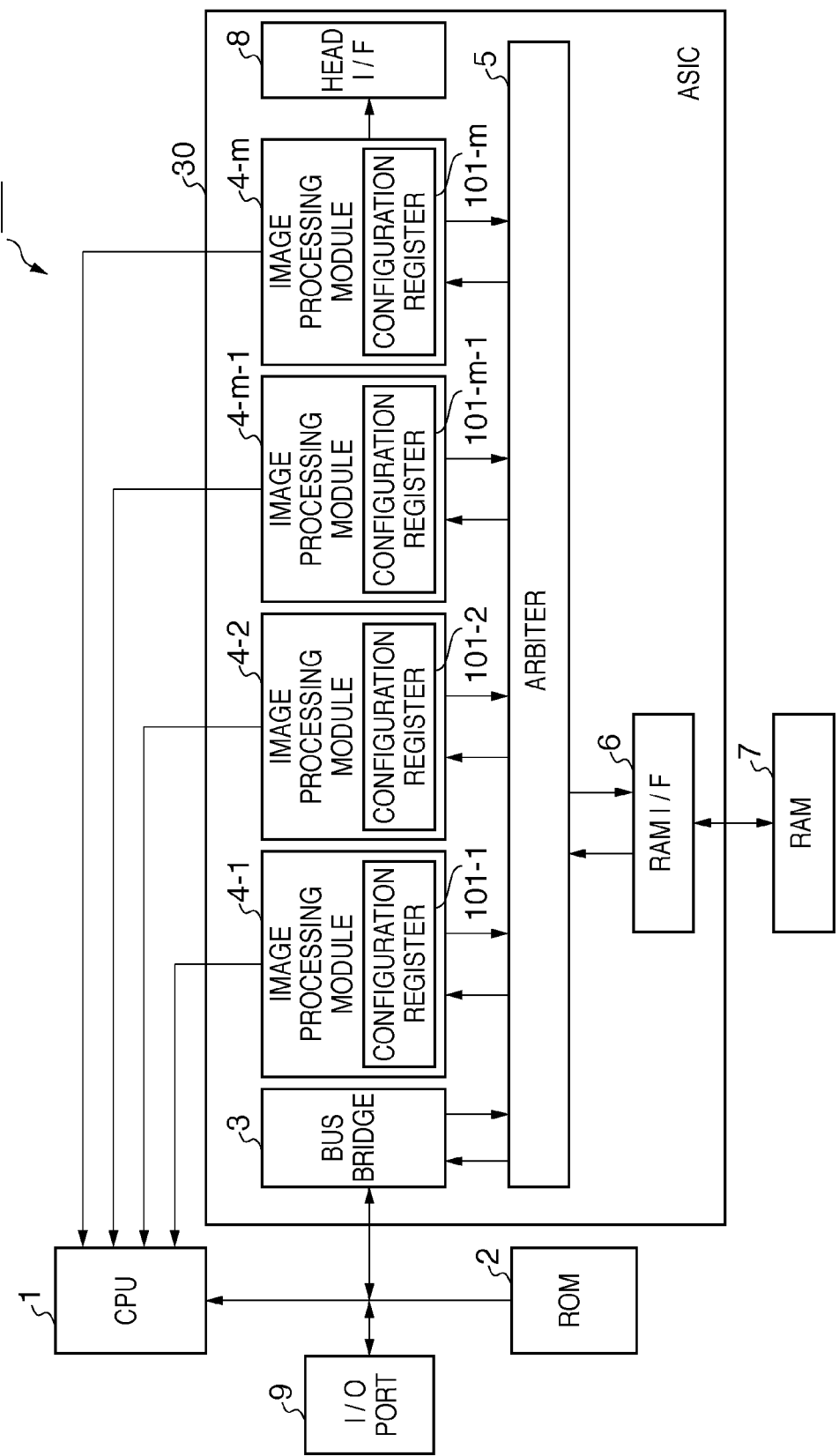
FIG. 2 is a block diagram showing an example of a control unit (not shown) of the image processing apparatus 100 shown in FIG. 1.

FIG. 2 is a block diagram showing an example of the control unit (not shown) of the image processing apparatus 100 shown in FIG. 1.

A CPU 1 systematically controls processes in the image processing apparatus 100. A ROM 2 stores programs and the like. A RAM 7 is used as, for example, an image rendering area and a work area required to execute programs. An ASIC (Application Specific Integrated Circuit) 30 generates, for example, a control signal required to control the printhead 52. The ASIC 30 includes m image processing modules 4-1 to 4-*m* (m is an integer equal to or larger than 1), which execute various image processes (these image processing modules will often be collectively referred to as an image processing module 4 hereinafter). As will be described in detail later, the image processing modules respectively include m configuration registers 101-1 to 101-*m* (m is an integer equal to or larger than 1) (these configuration registers will often be collectively referred to as a configuration register 101 hereinafter).

An arbiter 5 arbitrates access to the RAM 7. A RAM interface 6 is an interface with the RAM 7. A head interface (output interface) 8 is an interface with the printhead 52. Note that this embodiment will exemplify a case in which the RAM 7 is shared by the CPU 1 and the image processing modules 4-1 to 4-*m*. Alternatively, a RAM exclusively used by the CPU 1 may be independently arranged.

The operation of the image processing apparatus 100 upon reception of an image to be processed will be described below. When the image processing apparatus 100 receives an image at an I/O port 9, it stores the received image in the RAM 7 via a bus bridge (input interface) 3, the arbiter 5, and the RAM interface 6. This process is executed according to, for example, a program which is stored in the ROM 2 and is executed by the CPU 1.

Upon completion of storage of the image, the image processing apparatus 100 controls the CPU 1 to set parameters in the configuration register (to be simply referred to as a register hereinafter) 101-1 of the image processing module 4-1. The image processing module 4-1 starts its operation according to the set parameters. Note that the register 101 holds parameters required to control the operation of the image processing module. The register 101 holds, for example, an address range in the RAM 7 where the data is stored, and an address range in the RAM 7 as a storage destination of data after processing.

After the parameters are set in the register 101-1, the image processing module 4-1 reads out data from the RAM 7 or writes data in the RAM 7 according to the set parameters (address ranges in this case). The image processing module 4-1 executes its process according to the parameters. Upon completion of the process, the image processing module 4-1 generates an interrupt, and notifies the CPU 1 of completion of the process.

Upon reception of the interrupt notification, the CPU 1 analyzes that interrupt factor. In case of a notification sent upon completion of the read process, the CPU 1 sets a read address range of next data in the register 101-1 to continue the process of the image processing module 4-1. In case of a notification sent upon completion of the write process, the CPU 1 sets an address range as a storage destination of data after processing in the register 101-1 to continue the process of the image processing module 4-1. At this time, the CPU 1 sets parameters in the register 101-2 of the image processing module 4-2 to control the image processing module 4-2 to start its operation.

Upon setting the parameters, the image processing module 4-2 starts its process as in the image processing module 4-1. Then, upon completion of the read or write process described above, the image processing module 4-2 generates an interrupt, and notifies the CPU 1 of completion of the process. After that, the same process as that described above is executed and, for example, the image processing module 4-3 starts its operation. In this way, in the image processing apparatus 100, when the process in the certain image processing module 4 ends, the next image processing module 4 is activated to pass processed data in turn to the image processing modules 4. In this manner, a pipeline including the image processing module 4 as a unit is implemented.

During a period from when one image processing module 4 starts execution of an image process instructed by the CPU 1 until that image processing module 4 ends the image process to be ready to output the processed data, another image processing module 4 can parallelly execute a process. More specifically, data can be input from the RAM 7 to another image processing module 4, and data, the process of which ends in the other image processing module, can be output to the RAM 7. Furthermore, since each image processing module 4 executes an image process independently of other image processing modules 4, a plurality of image processing modules 4 can be parallelly operated to simultaneously progress a plurality of image processes.

After the process advances to the image processing module 4-m-1, as described above, and bitmap data having a predetermined size or more is generated, the CPU 1 activates the printing unit. The image processing module 4-m sends the bitmap data to the printing unit in synchronism with a sync signal of the printing unit. Then, an image is printed on a printing medium.

Figure 3:
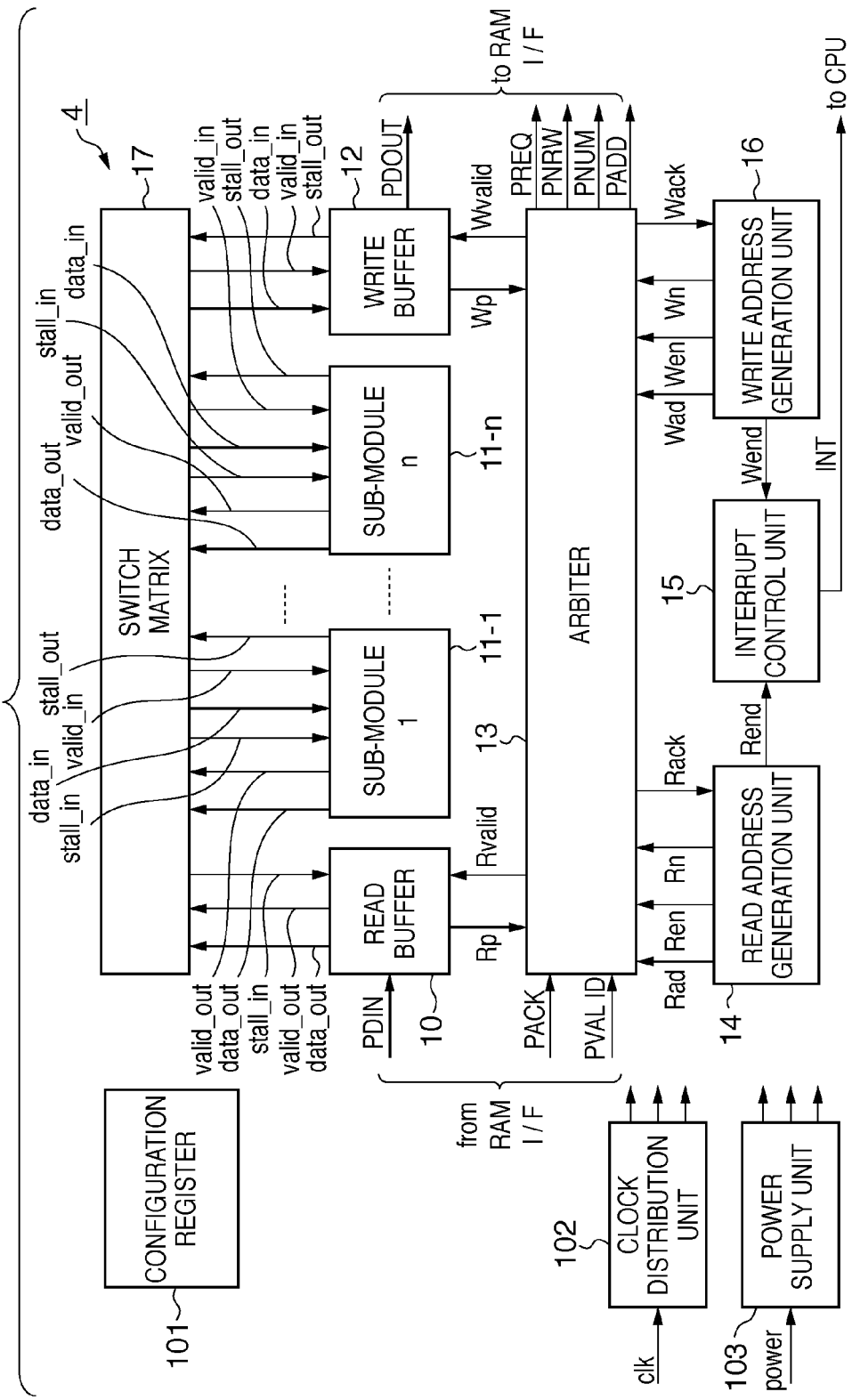
FIG. 3 is a block diagram showing an example of the arrangement of an image processing module 4 shown in FIG. 2.

FIG. 3 is a block diagram showing an example of the internal arrangement of the image processing module 4 shown in FIG. 2.

The image processing module 4 includes a read buffer 10, sub-modules 11-1 to 11-n (these sub-modules will often be collectively referred to as a sub-module 11 hereinafter), write buffer 12, arbiter 13, and read address generation unit 14. Furthermore, the image processing module 4 includes an interrupt control unit 15, write address generation unit 16, switch (switch matrix) 17, register 101, clock distribution unit 102, and power supply unit 103.

In the register (configuration register) 101, parameters associated with operations of the switch matrix 17, read address generation unit 14, write address generation unit 16, and the like are set. The clock distribution unit 102 distributes clock pulses clk of the apparatus to respective units in the image processing module 4. The clock distribution unit 102 can stop supply of clocks clk to an arbitrary sub-module 11 according to the settings in the register 101. The power supply unit 103 controls supply of electric powers to respective units in the image processing module 4. The power supply unit 103 can stop supply of an electric power to an arbitrary sub-module according to the settings in the register 101. The switch matrix 17 sequentially inputs data to a plurality of sub-modules 11 in a predetermined order. Then, a series of image processes to be applied to data to be processed are executed using the plurality of sub-modules 11.

The switch matrix 17 is a connection module/connection unit, which connects the read buffer 10, sub-modules 11, and write buffer 12 via data lines and control lines. For example, a line data_out of the read buffer 10 is connected to a line data_in of each sub-module 11. Likewise, a line valid_out of the read buffer 10 is connected to a line valid_in of each sub-module 11, and a line stall_out is connected to a line stall_in. These connections are attained based on the settings in the configuration register 101. The order that the switch matrix 17 inputs processing image data to the plurality of sub-modules 11 is decided in advance. This order can be fixedly decided like, for example, the read buffer 10, sub-module 1, sub-module 2, . . . , sub-module n, and write buffer 12. In this way, since the switch matrix 17 can fulfill its role by always moving the processing image data among the sub-modules in the predetermined order, the arrangement of the switch matrix 17 can be simplified. Also, depending on the parameters set in the configuration register 101 by the CPU 1, the connection state of the switch matrix 17 can be changed. Therefore, connections among the respective sub-modules and the data transfer order can be dynamically changed according to the processing contents to be executed by the image processing module 4. Therefore, by replacing the order of contents of processes to be given to the respective sub-modules, one image processing module 4 can implement various image processes. Note that the switch matrix 17 includes a known cross-bar switch or selector group. As another mode of the switch matrix 17, that of a Ring Bus may be adopted.

A case will be examined below wherein one image processing module 4 includes different types of sub-modules 11. Assume that sub-modules 1 (11-1) to n−1 (11-n-1) are those having an (adaptive) image processing unit 413 shown in FIG. 5 to be described later, and a sub-module n (11-n) is that having a (static) image processing unit 413 shown in FIG. 6 to be described later. In this case, the order that the (static) image processing unit 413 processes processing image data may be fixed, thus posing a disadvantage. However, such disadvantage can be eliminated by using a plurality of image processing modules 4 in combination. For example, in the first image processing module 4, the (adaptive) image processing unit 413 and (static) image processing unit 413 execute a former half image process including a process using the (static) image processing unit 413. Then, processing image data that has undergone the process using the (static) image processing unit 413 is transferred to the second image processing module 4. In the second image processing module 4 which received that processing image data, the (adaptive) image processing module 413 executes a latter half image process. In the second image processing module 4, after the (adaptive) image processing unit 413 executes the latter half image process, the data is directly transferred to the write buffer 12 without using the (static) image processing unit 413.

On the other hand, even when one image processing module 4 includes different types of sub-modules, it can be designed to change the order of processes among the sub-modules. This can be realized when the CPU 1 sets order information that instructs the order of processes among the sub-modules in the register 101, and the switch matrix 17 controls the input order of processing image data with reference to the order information. In this case, the arrangement of the switch matrix 17 is complicated compared to a case in which the order of processes among the sub-modules is fixed. However, in this case, since the plurality of image processing modules 4 can respectively execute different image processes, the image processes can be speeded up compared to a case in which one image process is executed using the plurality of image processing modules 4.

As described above, the CPU 1 sets parameters in the register 101 of the image processing module 4. When the CPU 1 sets a read start address and read end address as parameters, the read address generation unit 14 outputs a read enable signal Ren. At this time, the read address generation unit 14 outputs a read address Rad and a read access unit Rn from the RAM 7 with reference to the parameters set in the register 101. If Rn assumes a fixed value, the read address generation unit 14 may output Rn without referring to any parameters in the register 101. When the CPU 1 sets a write start address and write end address, the write address generation unit 16 outputs a write enable signal Wen. At this time, the write address generation unit 16 outputs a write address Wad and a write access unit Wn to the RAM 7 with reference to the parameters set in the register 101. If Wn assumes a fixed value, the write address generation unit 16 may output Wn without referring to any parameters in the register 101.

The arbiter 13 detects a free capacity Rp of the read buffer 10 and the read enable signal Ren from the read address generation unit 14. As a result of detection, assume that a read address is valid (Ren=1), and the read buffer 10 has a free area (Rp≥Rn (Rn: the read access unit from the RAM 7)). In this case, the arbiter 13 issues a read request (PREQ=1, PNRW=0, PNUM=Rn, PADD=Rad) to the arbiter 5.

On the other hand, if a data storage amount Wp of the write buffer 12 is equal to or larger than a predetermined size (Wp≥Wn (Wn: the write access unit to the RAM 7), the arbiter 13 detects the write enable signal Wen of the write address generation unit 16. Then, the arbiter 13 issues a write request to the arbiter 5. That is, if a write address is valid (Wen=1), and the write buffer 12 is ready to output data (Wp≥Wn), the arbiter 13 issues a write request (PREQ=1, PNRW=1, PNUM=Wnum, PADD=Wad) to the arbiter 5.

Upon reception of a request signal PREQ from the image processing module 4, the arbiter 5 determines based on a signal PNRW whether a read or write request is received (0: read, 1: write). The arbiter 5 detects a transfer size (the number of transfer words) based on a signal PNUM, and detects an address based on a signal PADD. If other requests (those from the CPU 1 and other image processing modules 4) are not received, the arbiter 5 begins to access that data in the RAM 7, and returns an acknowledge signal PACK to the image processing module 4 as a request source. On the other hand, if other requests are received, the arbiter 5 arbitrates processes corresponding to the requests, and controls to execute the processes in turn in accordance with a priority order.

Upon reception of the acknowledge signal PACK from the arbiter 5, the arbiter 13 determines whether that signal is that corresponding to the read or write request. In case of the read request, the arbiter 13 returns an acknowledge signal Rack to the read address generation unit 14 as a request source. Upon reception of the acknowledge signal Rack, the read address generation unit 14 generates an address in the RAM 7 as a data read source and outputs it as the address Rad. When the requested address (that generated by the read address generation unit 14) is the read end address set in the register 101, the read address generation unit 14 resets the read enable signal Ren. Also, the read address generation unit 14 outputs a read end signal Rend toward the interrupt control unit 15.

On the other hand, if the acknowledge signal PACK from the arbiter 5 is that corresponding to the write request, the arbiter 13 returns an acknowledge signal Wack to the write address generation unit 16 as a request source. Upon reception of the acknowledge signal Wack, the write address generation unit 16 generates an address in the RAM 7 as a data write destination. When the requested address is the write end address set in the register 101, the write address generation unit 16 resets the write enable signal Wen, and outputs a write end signal Wend toward the interrupt control unit 15.

The interrupt control unit 15 sets a read end interrupt mask and write end interrupt mask based on the parameters set in the register 101. If the setting of each interrupt mask is enabled, the interrupt control unit 15 generates an interrupt signal INT in response to the read end signal Rend or write end signal Wend, and notifies the CPU 1 of the generated signal.

Upon reception of the interrupt signal INT, the CPU 1 reads a status of the interrupt control unit 15 to determine an interrupt factor. As a result of determination, if the interrupt factor is the read end interrupt, the CPU 1 resets the read end interrupt mask to release the interrupt. When the process is to be continued, the CPU 1 re-sets a read start address and read end address in the register 101, and the read address generation unit 14 outputs a read enable signal Ren and the like accordingly. After that, the interrupt control unit 15 sets a read end interrupt mask.

On the other hand, as a result of reading the status of the interrupt control unit 15, if the interrupt factor is the write end interrupt, the CPU 1 resets the write end interrupt mask to release the interrupt. When the process is to be continued, the CPU 1 re-sets a write start address and write end address in the register 101, and the write address generation unit 16 outputs a write enable signal Wen and the like accordingly. After that, the interrupt control unit 15 sets a write end interrupt mask.

When data is read out from the RAM 7, the arbiter 5 returns a RAM data valid signal PVALID to the image processing module 4 as a request source. In the image processing module 4 as the request source, the arbiter 13 returns a data valid signal Rvalid to the read buffer 10. The read buffer 10 stores data included in a RAM data output signal PDIN while this data valid signal Rvalid is output. In this manner, data, which is read out from the RAM 7 based on an address indicated by a signal PADD (=Rad) (an address generated by the read address generation unit 14), is stored in the read buffer 10.

On the other hand, when data is written in the RAM 7, the arbiter 5 returns a RAM data valid signal PVALID to the image processing module 4 as a request source in synchronism with a write timing of the RAM 7. In the image processing module 4 as the request source, the arbiter 13 returns a data valid signal Wvalid to the write buffer 12. The write buffer 12 outputs data to be written using a RAM data input signal PDOUT while the data valid signal Wvalid is output. In this manner, data in the write buffer 12 is stored at an address in the RAM 7 indicated by a signal PADD (=Wad) (an address generated by the write address generation unit 16).

When all data required for the process of the sub-module 11 are stored, the read buffer 10 outputs a valid signal valid_out; otherwise, it resets the valid signal valid_out. The read buffer 10 sequentially outputs stored data to the line data_out in synchronism with clocks unless it receives a hold request signal stall_in from the sub-module 11. Note that when the read buffer 10 receives the hold request signal stall_in from the sub-module 11, it does not update data to be output to the line data_out. A hold request signal stall_out output from the sub-module 11 is input to the hold request signal stall_in of the read buffer 10. On the other hand, when the sub-module 11 is ready to output processed data to the write buffer 12, it outputs a valid signal valid_out; otherwise, it resets the valid signal valid_out. The sub-module 11 sequentially outputs stored data to the line data_out in synchronism with clocks unless it receives a hold request signal stall_in from the write buffer 12. When the sub-module 11 receives the hold request signal stall_in from the write buffer 12, it does not update data to be output to the line data_out. Note that a hold request signal stall_out output from the write buffer 12 is input to the hold request signal stall_in of the sub-module 11. Data exchange processes between the sub-modules 11 are executed in the same manner as the sequence between the sub-module 11 and the read buffer 10 or write buffer 12.

The sub-module 11 receives data from the read buffer 10 or another sub-module 11 via the line data_in while the read buffer 10 or the other sub-module 11 outputs a valid signal valid_out. The sub-module 11 outputs data to the write buffer or another sub-module 11 via the line data_in while it outputs a valid signal valid_out. Note that when data exchange processes are disabled, the sub-module 11 outputs a hold request signal stall_out. Thus, the sub-module 11 sets a hold request signal stall_in of the read buffer 10 or another sub-module 11 as a data transmission source to hold the output from the read buffer 10. When the write buffer 12 or another sub-module 11 cannot receive data, it outputs a hold request signal stall_out. Thus, the write buffer 12 or the other sub-module 11 sets a hold request signal stall_in of the sub-module 11 as a data transmission source to hold the output from the sub-module 11. The data input/output order among the read buffer 10, sub-module 11, and write buffer 12 is managed by the switch matrix according to the settings in the register 101. Then, according to this order, the lines data_in and data_out, valid_in and valid_out, and stall_in and stall_out are connected to input/output data. Note that the read buffer 10 and write buffer 12 may include, for example, FIFOs if input or output data need not be sorted.

As described above, the internal arrangement of the image processing module 4 includes one or more sub-modules 11. Between the respective sub-modules 11, data exchange processes are implemented by the aforementioned operations (handshakes using a valid signal valid and hold request signal stall (the lines "_in" of a certain module are connected to the lines "_out" of another module)). These sub-modules 11 are configured focusing attention on hardware resources required for various image processes. Thus, since the connection relationship, processing sequence, arithmetic precision, and the like of the sub-modules can be changed as needed, a compact and flexible image processing apparatus which can cover various processing modes can be configured. Since clocks to an unused sub-module 11 can be stopped, and power supply to an unused sub-module 11 can also be stopped, not only the processing speed and processing precision can be improved, but also consumption power can be suppressed.

Note that when the image processing module 4 is configured to be compatible with a variety of formats, divisional processes (multi-sequence processes) can be implemented. In this case, another module or the CPU is configured to execute even processes incompatible with the aforementioned hardware resources. Basically, it is desired to standardize the format of input data and output data among the read buffer 10, each sub-module 11, and write buffer 12. When the format is standardized, even when the processing order of sub-modules is to be replaced, or a specific sub-module is disabled, the input/output data format of data among the read buffer 10, each sub-module 11, and write buffer 12 remains unchanged.

In this embodiment, a format shown in FIG. 4 (to be referred to as processing image data hereinafter) is used as an input/output data format. This format is shared and used between, for example, the aforementioned sub-modules 11 and switch matrix 17. The processing image data includes, for example, a plurality of (three in this case) 8-bit attribute value fields 3024 to 3026 and 24-bit pixel value fields 3021 to 3023, as shown in FIG. 4. Note that the size and type of the format are not limited to them, and can be changed as needed.

The image processing module 4 adopts an index addressing method which acquires an index value from an index table upon input of the processing image data, and acquires an attribute value from a data table based on an address calculated based on the index value. Then, the image processing module 4 executes an image process according to each area in an image using the acquired attribute value.

Figure 5:
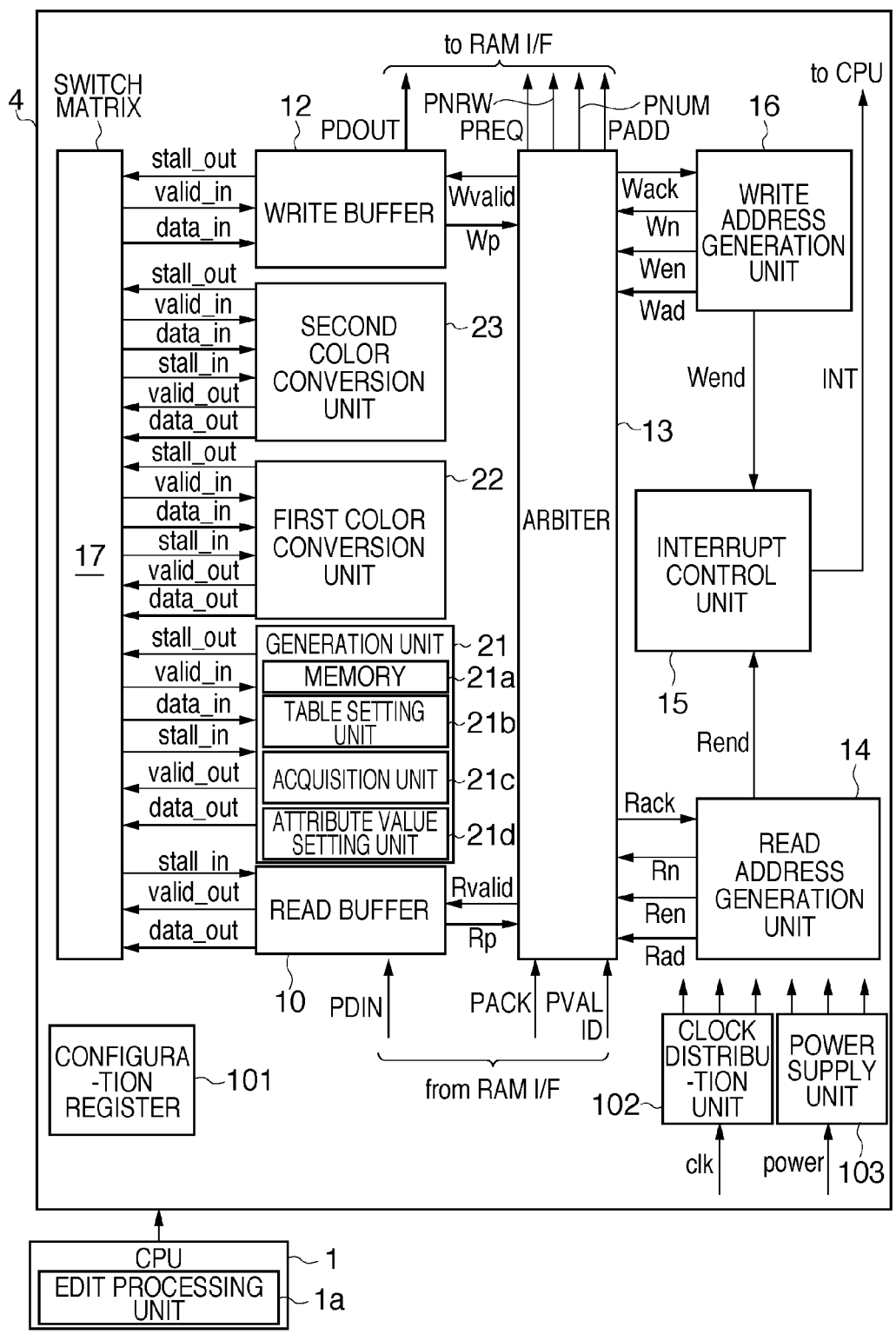
FIG. 5 is a block diagram showing an example of the arrangement of an image processing module 4 shown in FIG. 2.

FIG. 5 shows an example of the arrangement of the image processing module 4 when the respective sub-modules 11 are implemented as a generation unit (attribute value generation unit) 21, first color conversion unit 22, and second color conversion unit 23. Note that a plurality of image processing units need not always be arranged, and only the first color conversion unit 22 may be arranged as an image processing unit.

Prior to the description of the image processing module 4, processes executed by the CPU 1 will be explained. The CPU 1 includes, as a functional component, an edit processing unit 1a, which serves to generate the processing image data, described using FIG. 4. That is, the edit processing unit 1a edits image data that expresses an image to processing image data including, in correspondence with each pixel of the image, pixel value fields that hold pixel values of the pixel and attribute value fields that hold attribute values. When the processing image data generated by the CPU 1 is supplied to the respective sub-modules 11 in the image processing module 4, various image processes are executed. Note that this processing image data may be generated by, for example, the image processing module 4 in place of the CPU 1.

The first color conversion unit 22 executes a color conversion process using a linear lookup table (to be abbreviated as "LUT" hereinafter), and the second color conversion unit 23 executes a color conversion process using a three-dimensional LUT. Note that processes for the processing image data are executed in the order of the generation unit 21, first color conversion unit 22, and second color conversion unit 23. This order of processes is specified by setting it in the register 101. Therefore, setting different values in the register 101 can change the order of processes.

The generation unit 21 generates attribute values and sets them in the attribute value fields 3024 to 3026 shown in FIG. 4. The generation unit 21 executes a process for the processing image data prior to other sub-modules 11. Hence, the sub-modules 11, which execute processes after the generation unit 21, execute different processes for respective pixels based on the attribute values embedded in the attribute value fields of the processing image data by the generation unit 21. The generation unit 21 includes a memory 21a which stores a reference table (an index table, data table, etc.). That is, the index table and data table are written in the single memory included in the generation unit 21. This memory 21a is configured so that the sum of the sizes of the index table and data table matches a predetermined size. That is, when the size of one of these tables increases, the size of the other table decreases. Note that the contents and sizes of the tables can be changed as needed.

Note that the generation unit 21 includes, as functional components, a table setting unit 21b, acquisition unit 21c, and attribute value setting unit 21d.

The table setting unit 21b stores the index table and data table in the memory 21a. The table setting unit 21b changes a ratio between the sizes of the index table and data table according to an image processing mode at the time of storage. Note that table setting unit 21b changes the ratio of the tables and the like based on, for example, information which is set in the register 101 by the CPU 1.

The acquisition unit 21c acquires data (that is, attribute values) from the reference table stored in the memory 21a by the index addressing method. The attribute value setting unit 21d sets the acquired attribute values in the attribute value fields of the processing image data. That is, the generation unit 21 generates attribute values according to data held in the index table and data table. Note that the generation unit 21 executes predetermined processes (for example, a mask process, shift operation, and the like) for data acquired from the reference table, and sets values obtained after these processes as attribute values in some cases.

The reference table (index table, sub-index table, and data table) will be described below with reference to FIGS. 6 and 7.

FIG. 6 shows the contents of the memory 21a included in the generation unit 21 shown in FIG. 5. On the left side in FIG. 6, numerical values (0x00 to 0x0F) indicating addresses in the memory are shown. One address row means one word of the memory. In this case, a memory area for a 16-bit word×16 is shown.

In an address area "0x00 to 0x0B", the index table is stored. Note that the left side in FIG. 6 is an MSB (Most Significant Bit) for the sake of convenience. In the index table, a 1-bit index is defined for a plurality of pixels. The index table shown in FIG. 6 has a two-dimensional configuration, and is configured by a size of 16 bits×12 (a width=16 blocks, a height=12 blocks). This index table can hold data for 192 areas.

In an address area "0x0C to 0x0F", the data table is stored. Each data held in this area is set as an attribute value in correspondence with a pixel value. That is, the data held in the data table is set as an attribute value in some of the attribute value fields 3024 to 3026 shown in FIG. 4. Each attribute value field is configured by 8 bits, as described above. For this reason, one 16-bit data held in the data table can be set using two attribute value fields. Assume that the generation unit 21 sets and outputs arbitrary 8 bits of the 16-bit data in the data table in an arbitrary attribute value field.

Note that "0x0C" indicating the start address of the data table is held in, for example, a register (not shown) included in the generation unit 21 as a base address. Also, this register holds a sub-index value (for example, 2).

Figure 7:
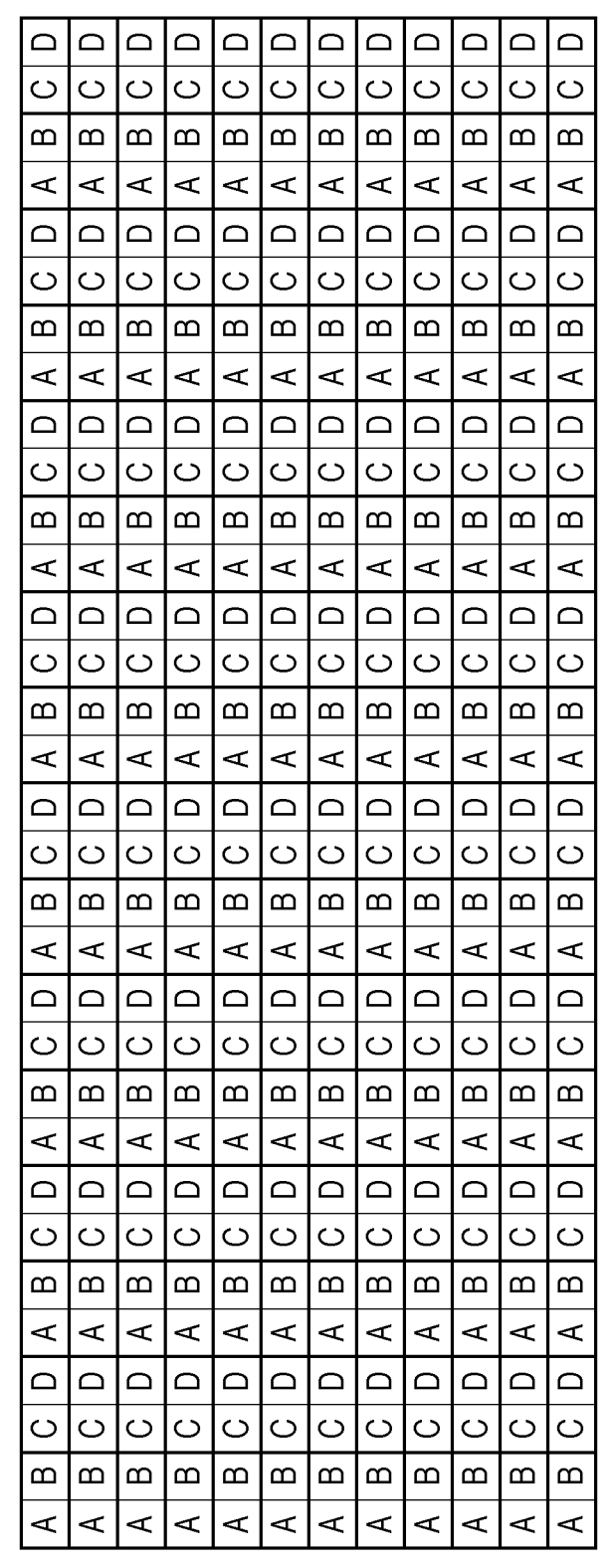

FIG. 7 shows an example of an image in which attribute values are set in correspondence with respective pixels. Each rectangular frame represents a pixel, and the image size in this case is 32 pixels in the horizontal direction×12 pixels in the vertical direction. Bold frames which bound every two horizontal pixels indicate blocks in which data are set from identical indices. Even in a block in which data are set from an identical index, for example, different data are set like, for example, A and B. Information indicating a generation pattern corresponding to each block (every two pixels) is described in the index table, and information indicating a change in pattern in each block is described in a sub-index table.

Figure 8:
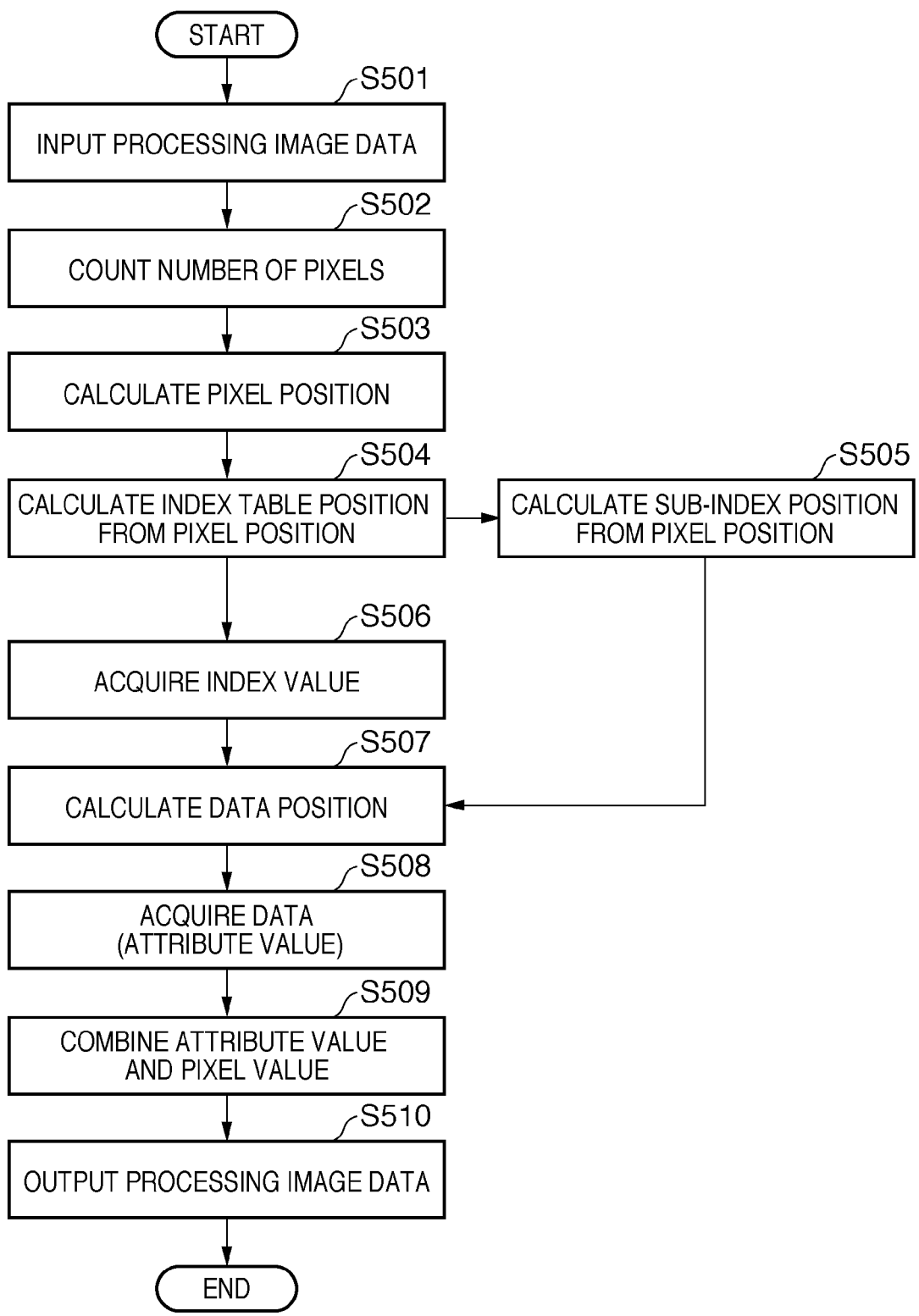
FIG. 8 is a flowchart showing an example of the operation of a generation unit 21 shown in FIG. 5.

An example of the operation of the generation unit 21 shown in FIG. 5 will be described below with reference to FIG. 8. Note that the following description will be given in association with values held in the reference table described using FIG. 6.

Upon reception of input processing image data (S501), the generation unit 21 counts the number of pixels (S502). The generation unit 21 counts the number of pixels processed from a process start timing. In this case, since an input pixel is the first pixel, a count value "0" is held in a register.

Upon completion of counting of the number of pixels, the generation unit 21 calculates a position of the input pixel viewed from the entire image based on the number of pixels (S503). In this case, the generation unit 21 divides the count value in step S502 by the image width, and sets a quotient as a Y position and a remainder as an X position (equations (1) and (2)). Note that the width of the image is defined as an X-direction, and the height is defined as a Y-direction for the sake of simplicity. In case of the first pixel, an image position is (X, Y): (0, 0).

$$(X \text{ position}) = (\text{count value in step } S502) \% (\text{input image width}) \qquad (1)$$

$$(Y \text{ position}) = (\text{count value in step } S502) / (\text{input image width}) \qquad (2)$$

Note that an operator "%" in equation (1) is a remainder operator. That is, a remainder value when a result obtained by dividing a term on the left side of the operator "%" by a term on the right side of the operator "%" is expressed by a quotient and remainder of integers is an operation result of the operator "%". Also, as given by equation (2), when a quotient and remainder are calculated in association with the division result, the quotient is calculate up to, for example, an integer.

The generation unit 21 calculates a corresponding position in the index table (index position) from the values (pixel position) calculated in step S503 (S504). Equations (3) and (4) describe calculation formulas of the index position. The X and Y positions are respectively divided by block sizes, and the quotients are respectively divided by the width and height of the index table. Remainders obtained at this time are respectively X and Y positions of the index table. Assume that the width and height directions of the image are equal to those of the index table. The reason why the corresponding position in the index table is calculated using such calculation formulas is that even when the image exceeds the size described in the index table, the index table is applied to the image in a tile pattern to allow the processing.

The generation unit 21 converts the calculated position in the index table into that of the index table on the memory. This process calculates a position of a block in the index table corresponding to the calculated position in the index table (equation (5)). Then, the calculated value is divided by a word length of the memory where the index table is stored. The quotient corresponds to an index address, and a remainder corresponds to an index bit position (equations (6) and (7)).

In the example shown in FIG. 6, "(X block size, Y block size): (2, 1)". For this reason, in case of the first pixel, "(index X position, index Y position): (0, 0)", and "index position=0". Furthermore, "index address position=0", and "index bit position=15".

(Index $X$ position)=($X$ position)/($X$ block size)%(index table width)     (3)

(Index $Y$ position)=($Y$ position)/($Y$ block size)%(index table height)     (4)

(Index position)=((index $Y$ position)×(index table width)+(index $X$ position))*(index bit depth)     (5)

(Index address position)=(index position)/(index table word length)     (6)

(Index bit position)=(index table word length)−1− (index position)%(index table word length)     (7)

The generation unit 21 calculates a sub-index position from the values (pixel position) calculated in step S503 (S505). The sub-index is used to change data to be appended within a single block. In this process, in order to calculate the sub-index position, the X and Y positions are respectively divided by X and Y block sizes. Then, sub-index X and Y positions are respectively calculated based on remainders of the above divisions (equations (8) and (9)). After that, the sub-index position is calculated using equation (10). In case of the first pixel, "(sub-index X position, sub-index Y position): (0, 0)", and "sub-index position=0".

(Sub-index $X$ position)=($X$ position)% (sub-index $X$ size)     (8)

(Sub-index $Y$ position)=($Y$ position)%(sub-index $Y$ size)     (9)

(Sub-index position)=(sub-index $Y$ position)×($X$ block size)+(sub-index $X$ position)     (10)

Next, the generation unit 21 acquires an index value from the index table based on the address position and bit position of the index table calculated using equations (6) and (7) (S506). In case of FIG. 6, the 15-th bit of the address area "0x00" is "0". Hence, "index value=0".

After the index value is acquired, the generation unit 21 calculates a data position (data address) based on that index value (S507). The data address is calculated by adding the index value calculated in the process in step S506 and the sub-index value calculated using equation (10) to the base address indicating the start address where the data table is stored (equation (11)). In case of the first pixel, "base address=0x0C", "index value=0", and "sub-index value=0". Hence, "data position=0x0C".

(Data position)=(base address)+(index value)*(sub-index $X$ size)*(sub-index $Y$ size)+(sub-index position)     (11)

The generation unit 21 acquires data based on the data address calculated in the process in step S507 (S508). In case of FIG. 6, "data=0x000A" is stored at "data position=0x0C".

After the data is acquired, the generation unit 21 combines the acquired value (data) with the processing image data (S509). Note that a predetermined process is applied to the value acquired from the data table if necessary at the time of this combination with the input pixel, as will be described in detail later. After that, the generation unit 21 outputs the combined processing image data (S510). That is, the generation unit 21 sets the acquired value (data) in association with pixel values (RGB) of the first pixel, and outputs processing image data obtained as a result of that setting. The generation unit 21 repeats the aforementioned processes in steps S500 to S510 as many as the number of pixels. Then, the data shown in FIG. 7 is obtained.

Index tables having the numbers of bits different from that of the index table shown in FIG. 6 will be described below with reference to FIGS. 9 and 10.

FIG. 9 shows an index table in which an index bit depth=2 bits, an index table size=64, a sub-index size=2, and a data table size=8.

The aforementioned table shown in FIG. 6 holds data which allow to generate four types of attribute values, while the table shown in FIG. 9 holds data which allow to generate more complicated, eight types of attribute values. In this embodiment, since the index table and data table are stored in the single memory (memory 21a), when the area of the data table increases, that of the index table decreases. That is, the complexity of the types of attribute values and segmentation of output values have a tradeoff relationship.

FIG. 10 shows an index table in which an index bit depth=4 bits, an index table size=24, a sub-index size=1, and a data table size=10.

In the table shown in FIG. 10, in order to more complicate the data table, the index bit depth is 4 bits. Since the index bit depth is 4 bits, a maximum of 16 types of attribute values can be covered. However, since this table stores only 10 types of attribute values, the data table holds only data corresponding to them. That is, the index table does not describe index values 10 to 15 having no corresponding data. The generation unit 21 has been described. In the above description, the calculation processes implemented using a multiplier and divider have been exemplified. Alternatively, the aforementioned calculation processes may be implemented using counters without using any multiplier and divider.

Figure 11:
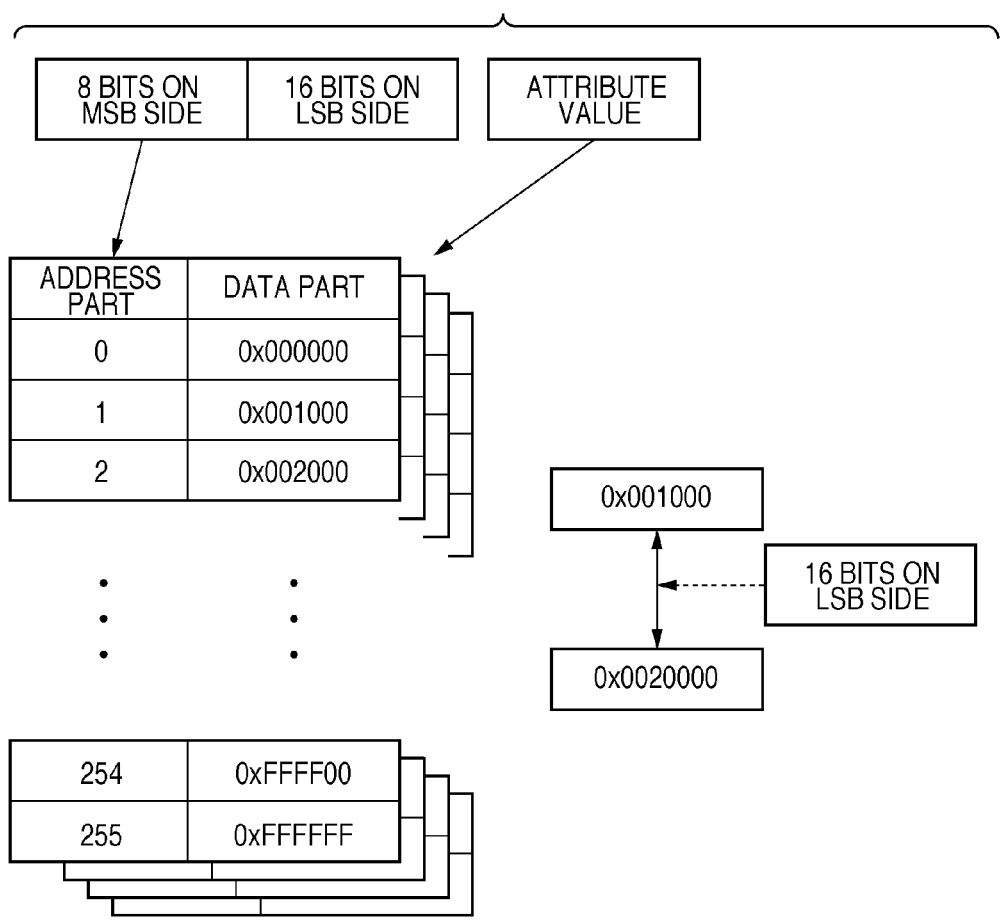
FIG. 11 is a view showing an example of an overview of a process in a first color conversion unit 22 shown in FIG. 5.

The first color conversion unit 22 shown in FIG. 5 will be described below with reference to FIG. 11. The first color conversion unit 22 generates and outputs 8-bit output data in response to, for example, 8-bit input data. In this case, a linear LUT to be referred to stores 8-bit data in areas for 16 entries.

When the processing image data is input, the first color conversion unit 22 uses the upper 4 bits of a pixel value as an address, and refers to data in the linear LUT based on that address. Furthermore, the first color conversion unit 22 also refers to data in the linear LUT at a position specified by adding "1" to the above address. The first color conversion unit 22 makes an interpolation operation between these two data using the lower 4 bits as the pixel value, and outputs the interpolation result. The first color conversion unit 22 repetitively executes this process for R, G, and B components. The first color conversion unit 22 holds, for example, three linear LUTs, and switches the LUT for each pixel according to the attribute value held in the processing image data.

The processing image data according to this embodiment includes the three attribute value fields, as shown in FIG. 4. For this reason, the first color conversion unit 22 loads an arbitrary attribute value field value to change the LUT. The attribute value field to be referred to may be designated by, for example, a parameter in the register 101.

The second color conversion unit 23 will be described below. The second color conversion unit 23 uses the upper 4 bits of a pixel value as an address, and the lower 4 bits of the pixel value in an interpolation operation, as in the first color conversion unit 22. The second color conversion unit 23 executes a three-dimensional color conversion process using three, R, G, and B components. This point is different from the color conversion process in the first color conversion unit 22. The second color conversion unit 23 holds, for example, three three-dimensional LUTs, and switches the LUT for each pixel according to the attribute value set in the processing image data. Upon switching the LUT, the attribute value field as a reference destination can be changed as needed as in the first color conversion unit 22. The arrangement of the image processing apparatus 100 according to this embodiment has been described.

First Embodiment

The image processes in the aforementioned image processing apparatus 100 will be described below taking practical examples. The first embodiment will explain the operation of the image processing apparatus 100 in a first image processing mode. In the first image processing mode, respective areas in an input image are determined, and different color conversion processes are executed for respective areas according to the determination results (for example, a text area and photo area). Note that the first embodiment does not use any sub-index.

Figure 12:
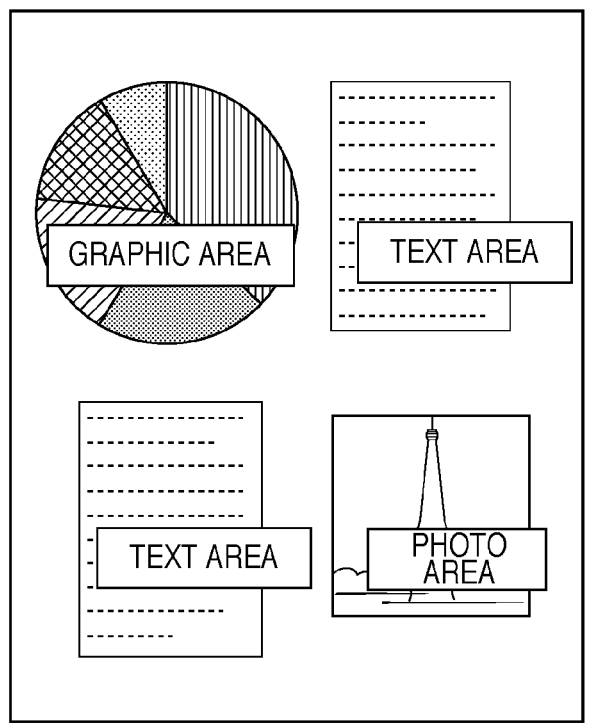
FIG. 12 is a view showing an example of an image.

FIG. 12 shows an example of an input image. This image is roughly divided into four areas in correspondence with objects. A circular graph is laid out on the upper left area, text is laid out on the upper right and lower left areas, and a photo is laid out on the lower right area. Note that the image processing apparatus 100 (for example, an application) recognizes layout information indicating the positions and sizes of the respective areas in advance. The generation unit 21 generates map information based on this layout information. The map information is used upon generation of attribute values. Note that the layout information need not always be given, and a mode of determining (identifying) objects may be adopted.

The generation unit 21 sets different attribute values for respective pixels for graphic, text, and photo areas. The image process for each pixel is switched and executed based on this attribute value. The first color conversion unit 22 executes, for example, an image process that emphasizes black and white contrast levels compared to other areas (graphic area and photo area) for the text area. The second color conversion unit 23 executes, for example, a color conversion of photo tones for the photo area, and a graphic-oriented color conversion for the text and graphic areas.

Two roughly classified image processes according to this embodiment will be described below. The first process is a setting process associated with the operation of the generation unit 21, table configurations, and the like, and the second process is an image process (color conversion) according to the settings of the setting process.

[Setting Process]

Figure 13:
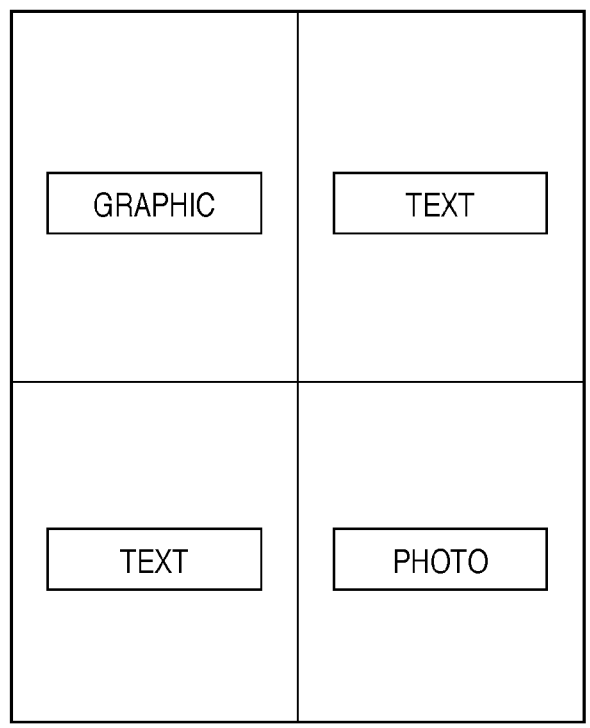
FIG. 13 is a view showing an example of map information based on the image shown in FIG. 12.

The setting process associated with the operation of the generation unit 21, table configurations, and the like will be described first. A case will be described wherein the image processes are executed for the image shown in FIG. 12. Map information based on the image shown in FIG. 12 has a configuration shown in FIG. 13. That is, the layout of this original is roughly classified into four areas: the upper left area is a graphic area; the upper right and lower left areas are text areas; and the lower right area is a photo area.

Figures 14, 15:
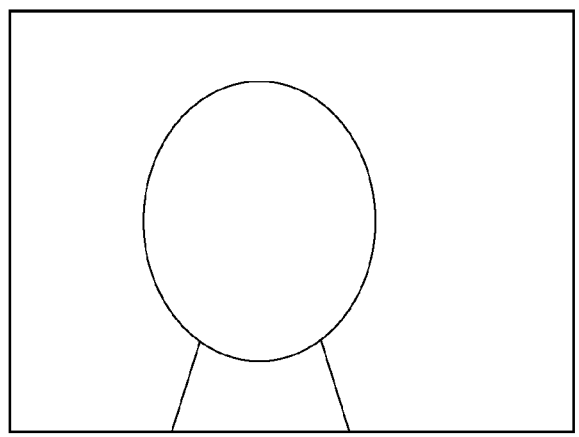
FIG. 14 is a view showing an example of a reference table.
FIG. 15 is a view showing an example of an image.

FIG. 14 shows an index table and data table. The index table includes a plurality of elements (in this case, three types) required to execute image processes using different attribute values for the respective areas (in this case, three areas). In this case, "0" is assigned to an index value of the graphic area, "1" is assigned to that of the text area, and "2" is assigned to that of the photo area. In this embodiment, the image processing direction corresponds to a left-to-right direction, and also a top-to-bottom direction. For this reason, index values are described in the index table in the order of "0", "1", "1", and "2" in correspondence with the processing direction.

Since the index table is defined by only 8 bits, the data table is described from an address area "0x01". The address area "0x01" holds an attribute value used in the image process for the graphic area, and an address area "0x02" holds an attribute value used in the image process for the text area. Also, an address area "0x03" holds an attribute value used in the image process for the photo area.

"Table 1" shows register setting values of the generation unit 21. In this case, there are three areas having different image characteristics. For this reason, since only three patterns of attribute values are required, an index bit depth is set to be 2 bits. The index table is defined by a width=2 and a height=2. As described above, since this embodiment does not use any sub-index, a sub-index X size is set to be 1, and a sub-index Y size is set to be 1. When the sub-index X and Y sizes are set to be 1, sub-index X and Y positions in equations (8) and (9) are set to be "1" as a special process. Since the entire image is divided into four areas, an X block size is set to be ½ of an image width, and a Y block size is set to be ½ of an image height. Also, the image width and height are respective set as w and h. As a base address, "0x01" is set since it is the start address of the data area.

Finally, the generation unit 21 sets data (bit sequence) acquired from the data table in some of the three attribute value fields 3024 to 3026 in the processing image data shown in FIG. 4. In the attribute value field, data is processed using a mask value and shift value of the register setting values, and data after these processes is set. More specifically, a mask process is executed using the data table and the mask value of the register setting values, and a shift operation by the shift value is then executed. As a result, the value to be stored in the attribute value fields is acquired from the data table. In this embodiment, 8 bits on the MSB side in the data table are set in the attribute value field 3024, and 8 bits on the LSB (Least Significant Bit) side are set in the attribute value field 3025. That is, the attribute value field 3024 is referred to by the linear LUT process (first color conversion unit 22), and the attribute value field 3025 is referred to by the three-dimensional LUT process (second color conversion unit 23). Thus, image data is transferred in turn to a plurality of (two) processing modules so as to parallelly execute the two processing modules. In this way, the setting process for the generation unit 21 is completed.

TABLE 1

| | |
|---|---|
| Index bit depth | 2 |
| Index table width | 2 |
| Index table height | 2 |
| Sub-index X size | 1 |
| Sub-index Y size | 1 |
| X block size | w/2 |
| Y block size | h/2 |
| Image width | w |
| Image height | h |

TABLE 1-continued

| Base address | 0x01 |
| --- | --- |
| Attribute value field 1 (3024) mask | 0xFF00 |
| Attribute value field 1 (3024) shift | 8 |
| Attribute value field 2 (3025) mask | 0x00FF |
| Attribute value field 2 (3025) shift | 8 |
| Attribute value field 3 (3026) mask | 0x0000 |
| Attribute value field 3 (3026) shift | 0 |

TABLE 2

| X position | Y position | Index X position | Index Y position | Index position | Index address position | Index bit position | Index value |
| --- | --- | --- | --- | --- | --- | --- | --- |
| 0 to w/2 | 0 to h/2 | 0 | 0 | 0 | 0 | 15 | 0 |
| w/2 to w | 0 to h/2 | 1 | 0 | 1 | 0 | 13 | 1 |
| 0 to w/2 | h/2 to w | 0 | 1 | 2 | 0 | 11 | 1 |
| w/2 to w | h/2 to w | 1 | 1 | 3 | 0 | 9 | 2 |

Next, the settings of the linear LUTs and three-dimensional LUTs will be described below. Items required to be set in association with the linear LUTs and three-dimensional LUTs are those about which of attribute value fields shown in FIG. 4 is used to switch the LUT to be referred to. As described above, the linear LUTs are switched with reference to the attribute value field 3024 shown in FIG. 4, and the three-dimensional LUTs are switched with reference to the attribute value field 3025 shown in FIG. 4. Such switching processes are implemented by setting them as parameters in, for example, the register 101.

In the first embodiment, since attribute values of three patterns need only be generated, both the linear LUT and three-dimensional LUT are prepared in correspondence with three patterns. The lower 3 bits of each data field are used in table selection. A linear LUT for the text area is referred to when the lower 3 bits="1", and a linear LUT for the photo and graphic areas is referred to when the lower 3 bits="0". Likewise, a three-dimensional LUT for the text and graphic areas is referred to when the lower 3 bits="1", and a three-dimensional LUT for the photo and graphic areas is referred to when the lower 3 bits="0".

[Image Conversion Process]

The image conversion process according to the operation set by the aforementioned setting process will be described below. In the following description, assume that the generation unit 21 sets attribute values according to the aforementioned settings in processing image data.

In the image conversion process, an image process is applied to the graphic area (upper left area) first. "0x00" is set in the attribute value field 3024 shown in FIG. 4, and "0x01" is set in the attribute value field 3025 shown in FIG. 4. More specifically, the generation unit 21 counts the number of pixels every time a pixel to be processed is input (the count process in step S502 described in FIG. 8). After that, the generation unit 21 calculates X and Y positions according to equations (1) and (2). The generation unit 21 then calculates index X and Y positions according to equations (3) and (4). The index X position assumes "0" until the X position is w/2, and assumes "1" when it exceeds w/2. The index Y position assumes "0" until the Y position is h/2, and assumes "1" when it exceeds h/2. After that, the generation unit 21 calculates an index position according to equation (5). The generation unit 21 calculates an index address position and index bit position according to equations (6) and (7). The index address position always assumes "0", and its bit position changes from "9" to "15". The generation unit 21 calculates an index value by referring to the reference table shown in FIG. 14 based on the calculated index address position and index bit position. The relationship among variables described so far is summarized like "Table 2".

Then, the generation unit 21 calculates a sub-index according to equations (8) to (10). However, in the first image processing mode, a sub-index is not used. For this reason, the generation unit 21 sets "0" in a sub-index position as the special process.

Finally, the generation unit 21 calculates a data position according to equation (11). Since "base address=0x01", the generation unit 21 sets, as an address, a numerical value obtained by adding the index value to this value, and refers to the table shown in FIG. 14 based on this address. In this way, the generation unit 21 obtains data as an attribute value source.

The generation unit 21 performs a mask process and shift operation for the acquired data using an attribute value field mask and attribute value field shift value. Thus, the generation unit 21 divides the data as the attribute value source into attribute values corresponding to the respective attribute value fields. The generation unit 21 sets the obtained values in the respective attribute value fields as attribute values. In this case, the generation unit 21 sets the upper 8 bits of the data as the attribute value source in the attribute value field 3024 and the lower 8 bits in the attribute value field 3025. The processes executed by the generation unit 21 have been described.

The processing image data processed by the generation unit 21 is input to the first color conversion unit 22. The first color conversion unit 22 refers to the lower 3 bits of the attribute value field 3024 shown in FIG. 4 according to the attribute value. In this case, since the value is "0", the first color conversion unit 22 executes an image process using the linear LUT for the photo and graphic areas.

Then, the processing image data is input to the second color conversion unit 23. The second color conversion unit 23 refers to the lower 3 bits of the attribute value field 3025 shown in FIG. 4. In this case, since the value is "1", the second color conversion unit 23 executes an image process using the three-dimensional LUT for the text and graphic areas. These processes are repetitively executed for other pixels.

As described above, according to the first embodiment, the data table which holds data (attribute values or values as attribute value sources) and the index table which holds index values are stored in the single memory. Then, data is acquired from the data table by the index addressing method based on a pixel position in an image, and the acquired data is set as attribute values in correspondence with each pixel. Upon execution of image processes, the image processes are switched and executed for respective pixels based on the attribute values set in correspondence with the pixels.

In this manner, the load on the data transfer control can be reduced.

Second Embodiment

The second embodiment will be described below. The second embodiment will explain the operation of the image processing apparatus 100 in a second image processing mode.

In the second image processing mode, a process called dodging is applied to a face area in an image. In general, this image process (dodging) requires different processes for the face area and remaining area. For this reason, when a face-oriented image correction is uniformly applied to the entire image, a background is blurred. On the other hand, when a background-oriented image correction is uniformly applied to the entire image, a process of the face area does not suffice.

That is, different image processes have to be applied to the face area and remaining area. As another problem, when different image processes are applied to respective areas, their boundary area suffers a trouble. Since different image processes are applied to the respective areas, a switching pattern of the processes stands out in the boundary area. To solve this problem, the second embodiment switches these different image processes step by step. In this way, this trouble in the boundary area is eliminated.

[Setting Process]

Assume that an image shown in FIG. 15 is input. A central oval in this image indicates a face area. The image processing module 4 applies a face detection process to this image to calculate the position and size of the detected face area. Also, the image processing module 4 generates map information.

Figure 16:
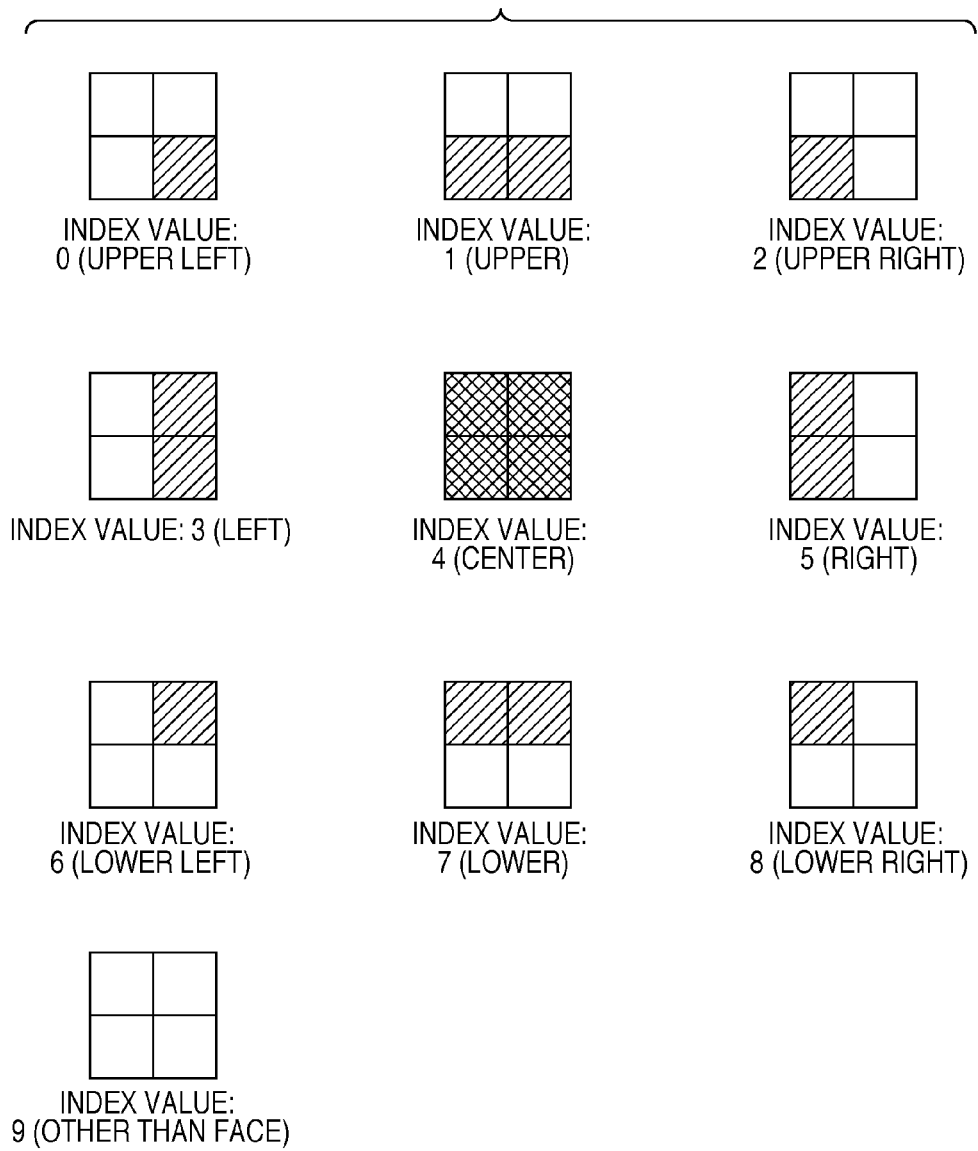
FIG. 16 is a view showing an overview of map information based on the image shown in FIG. 15.

A generation process of the map information will be described below. Blocks each having a size of 2×2 pixels are mapped on the entire image. Then, the mapped blocks are classified into a plurality of types, as shown in FIG. 16. Note that each rectangle shown in FIG. 16 represents a pixel, and 2×2 pixels express one block.

The image shown in FIG. 15 is roughly classified into three areas. More specifically, the image is classified into a boundary area (index values=0 to 3 and 5 to 8), the center of a face area (index value=4), and an area other than the face area (index value=9). The boundary area is divided into blocks for eight directions depending on their directions from the center of the face. Of rectangles corresponding to pixels in each block, open rectangles correspond to pixels used to process the area other than the face area. Each hatched rectangle corresponds to a pixel used to process the boundary area, and a middle image process between the face area and the area other than the face area is applied. Also, each cross-hatched rectangle corresponds to a pixel used to process the face area.

The generation unit 21 generates attribute values using the map information as index values. In this way, different image processes can be applied to the face area, the area other than the face area, and their boundary area. The generation unit 21 acquires data from a data table by the index addressing method based on the position of a block to which processing image data of interest belongs every time the processing image data that belongs to a different block is input. Then, the generation unit 21 sets attribute values in the processing image data based on that data.

Figure 17:
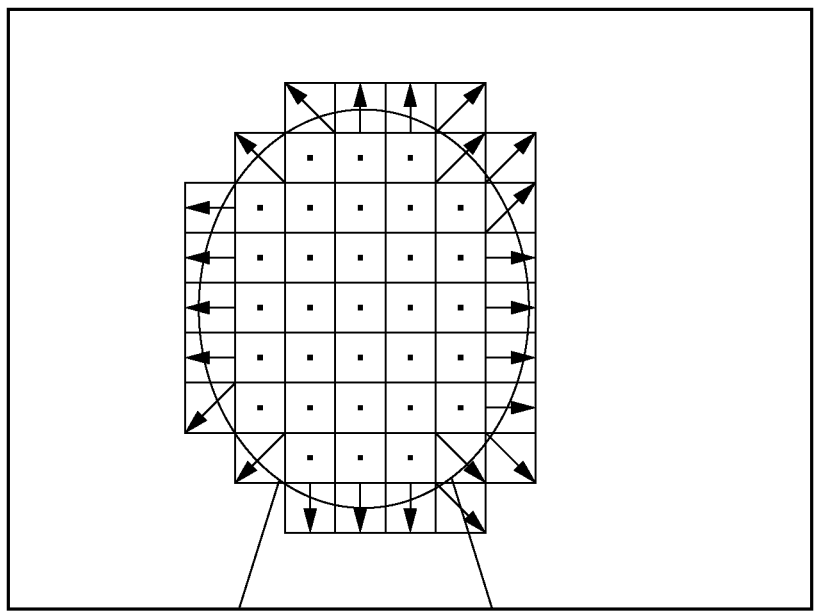
FIG. 17 is a view showing an overview of map information based on the image shown in FIG. 15.

FIG. 17 shows an overview of the map information generated by the aforementioned process. Each rectangle indicates a block. A region including no rectangles indicates the area other than the face area, and blocks are not illustrated in this region. Areas including dots in rectangles indicate blocks of the face area. Areas including arrows in rectangles indicate blocks of the boundary area. The directions of the arrows indicate outward directions from the center of the face, and indicate patterns represented by index values=0 to 3 and 5 to 8.

The map information generated in this way is stored in a memory of the generation unit 21. In this manner, the setting process for the generation unit 21 is completed.

Memory use amounts in a case in which the process is executed for respective blocks and not that case will be described below. The size of a reference table when index values are set for respective pixels without using blocks will be examined first. The size of the reference table can be calculated using:

$$\text{(Table size)}=\text{(index bit depth)}\times w/\text{(block } X \text{ size)}\times h/\text{(block } Y \text{ size)}+\text{(data table size)} \quad (12)$$

where w is the width of an image to be processed, and h is the height of the image.

Upon execution of the process using three patterns (the face area, boundary area, and area other than the face area) of data tables, an index bit depth requires 2 bits, and the data table size is given by three patterns×word. That is, the size of the reference table required when no blocks are used is calculated by:

$$\text{(Required table size)}=3\times w\times h+3\times\text{(word length)} \quad (13)$$

The size of the reference table when blocks (2×2 pixels) are used will be examined below. The reference table size is calculated using equation (12) in the same manner as in the above case.

The size of each of data tables (10 types in this case) is increased by 4×(word length). Since 10 types of data tables are used, a bit depth of an index value requires 4 bits. On the other hand, the index table size is reduced to ¼ since 2×2 pixels are used as one block. That is, the reference table size when blocks are used is calculated by:

$$\text{(Required table size)}=4\times w\times h/4+40\times\text{(word length)} \quad (14)$$

Upon comparison between equations (13) and (14), equation (14) is larger in the latter half of the right-hand side (that is, the data table size). More specifically, equation (14) is larger by 37×(word length). As a difference between the former halves of the right-hand sides (that is, the index table sizes), equation (13) is larger by 2×w×h. Since it is hard to consider that an image size is several pixels, the size calculated by equation (14) is normally smaller. That is, when the process is executed for respective blocks, the memory consumption amount can be suppressed.

"Table 3" shows register setting values of the generation unit 21. An index bit depth requires 4 bits since it is required to indicate 10 types, as described above. An index table defines blocks as many as the width w/2 and height h/2, as described above. Since a sub-index is defined by a size of 2×2 pixels, a sub-index X size=2, and sub-index Y size=2. Also, an X block size is set to be 2, and a Y block size is set to be 2. The width and height of an image are respectively set as w and h. Since a base address indicates a start address of a data area, (w/2)*(h/2)*(index bit depth: 4)/(word length: 16) is set. Finally, a bit sequence in the data area is set in some of the three attribute value fields 3024 to 3026 shown in FIG. 4. This point corresponds to the same process as in the aforementioned first image processing mode. The setting process for the generation unit 21 has been described.

TABLE 3

| | |
|---|---|
| Index bit depth | 4 |
| Index table width | w/2 |
| Index table height | h/2 |
| Sub-index X size | 2 |
| Sub-index Y size | 2 |
| X block size | 2 |
| Y block size | 2 |
| Image width | w |
| Image height | h |
| Base address | (w/2)*(h/2)*4/16 |
| Attribute value field 1 (3024) mask | 0xFF00 |
| Attribute value field 1 (3024) shift | 8 |

TABLE 3-continued

| | |
|---|---|
| Attribute value field 2 (3025) mask | 0x00FF |
| Attribute value field 2 (3025) shift | 8 |
| Attribute value field 3 (3026) mask | 0x0000 |
| Attribute value field 3 (3026) shift | 0 |

[Image Conversion Process]

An image conversion process will be described below. A difference from the first image processing mode, that is, a generation process will be described.

Respective positions and address are calculated according to equations (1) to (7) as in the first image processing mode. As a difference, a sub-index is then calculated according to equations (8) to (10).

In this case, since the sub-index is defined by the size of 2×2 pixels, the sub-index X position and sub-index Y positions assume values obtained by masking the lower 1 bit of the X position and Y position, as given by equations (8) and (9). These values are substituted in equation (10). In this way, a sub-index position is calculated.

Figure 18:
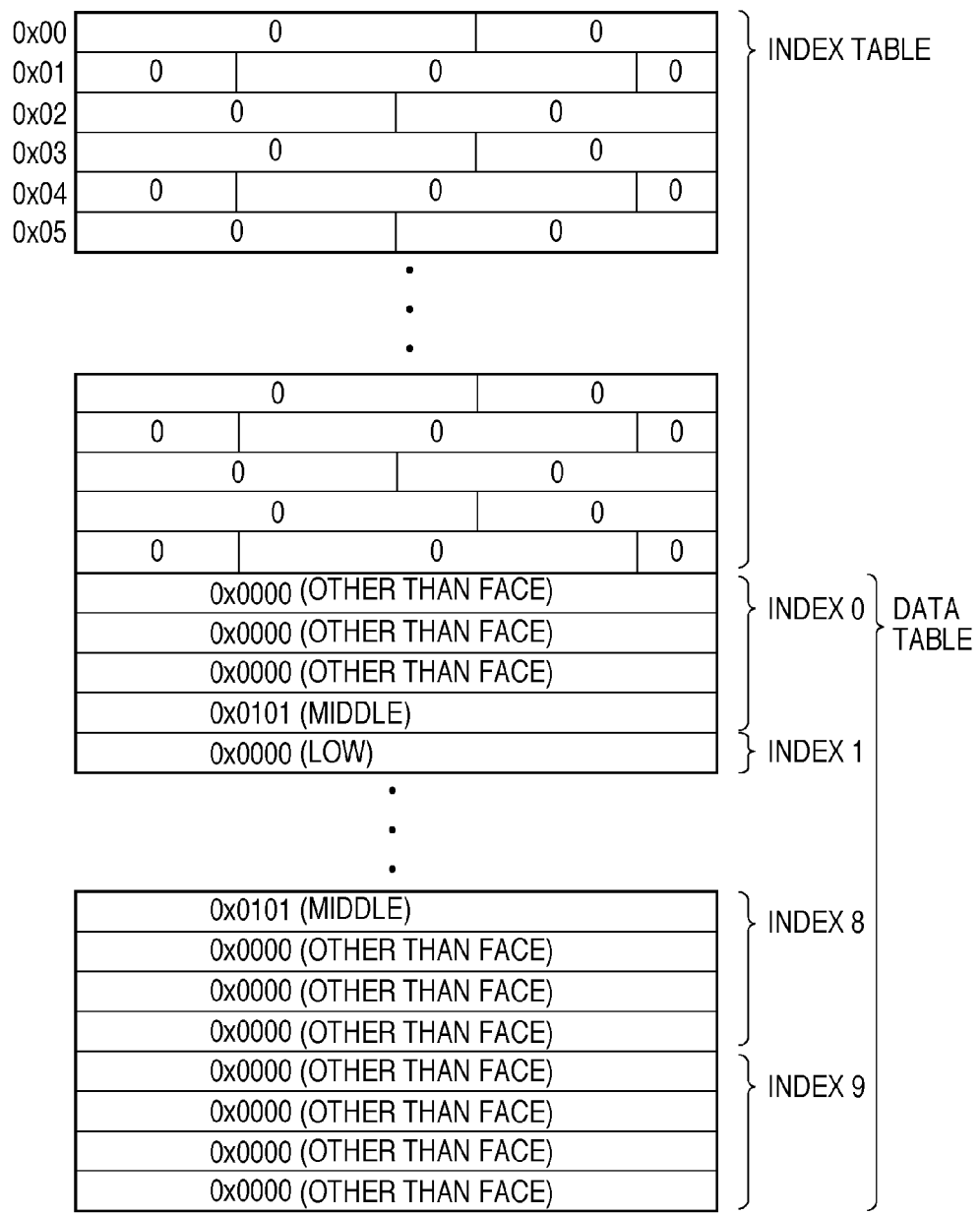
FIG. 18 is a view showing an example of a reference table.

Finally, a data position (data address) is calculated according to equation (11). In this case, since "base address=(w/2)*(h/2)*4/16", the index value and the sub-index value calculated using equation (10) are added to this value. A data table shown in FIG. 18 is referred to using the obtained value as an address. Thus, data corresponding to that address is obtained.

Next, a mask process and shift operation are executed for the acquired data using an attribute value field mask and attribute value field shift value. Data acquired in this way is divided into attribute values corresponding to the attribute value fields. The divided values are set in the attribute value fields as attribute values.

A linear LUT for the face area is set to be referred to when the lower 3 bits="2". A middle linear LUT is set to be referred to when the lower bits="1". A linear LUT for the area other than the face area is set to be referred to when the lower 3 bits="0". The same applies to three-dimensional LUTs.

As described above, according to the second embodiment, an image is divided into blocks each including a plurality of neighboring pixels and, for example, attribute values are set for respective blocks. In this way, the size of the memory which stores the reference table can be further suppressed compared to the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-158194 filed on Jul. 2, 2009, which is hereby incorporated by reference herein in its entirety.

What is claimed is:

1. An image processing apparatus, comprising:
 a determination unit configured to determine, in a predetermined area of a memory, an area for holding attribute data and an area for holding index data to specify the attribute data;
 an obtaining unit configured to obtain attribute data which corresponds to an input pixel of input image data from the area for holding attribute data in the predetermined area of the memory, in accordance with index data which is specified based on a position of the input pixel; and
 a processing unit configured to perform image processing, based on the attribute data obtained by the obtaining unit, to a pixel value of the input pixel,
 wherein the determination unit determines assignment of the area for holding index data and the area for holding attribute data in the predetermined area of the memory, in accordance with a content of the image processing which the processing unit performs to the pixel value of the input pixel.

2. The apparatus according to claim 1,
 wherein the predetermined area has a predetermined size, and
 the determination unit determines assignment, in the predetermined size, of a size of the area for holding index data and a size of the area holding for attribute data.

3. The apparatus according to claim 2,
 wherein, in the predetermined size, each of the size of the area for holding index data and the size of the area for holding attribute data is changeable.

4. The apparatus according to claim 1,
 wherein a ratio of a size of the area for holding index data to a size of the area for holding attribute data is changeable.

5. The apparatus according to claim 1,
 wherein a sum of a size of the area for holding index data and a size of the area for holding attribute data is a predetermined value.

6. The apparatus according to claim 1, further comprising a generation unit configured to generate image data for processing, which includes a pixel value of the input image data and an attribute value based on the attribute data obtained by the obtaining unit,
 wherein the processing unit performs the image processing to the pixel value of the image data for processing, generated by the generation unit.

7. The apparatus according to claim 6,
 wherein the generation unit uses the attribute data obtained by the obtaining unit as the attribute value.

8. The apparatus according to claim 6,
 wherein the generation unit uses the value obtained by performing predetermined processing to the attribute data obtained by the obtaining unit, as the attribute value.

9. The apparatus according to claim 6,
 wherein the image data for processing includes one or more pixel value fields each including a pixel value and one or more attribute value fields each including an attribute value.

10. The apparatus according to claim 9,
 wherein the generation unit generates the image data for processing, by setting a plurality of attribute values to the attribute value of each attribute field, and
 the plurality of attribute values are obtained by performing the predetermined processing to the attribute data obtained by the obtaining unit.

11. The apparatus according to claim 1,
 wherein the obtaining unit obtains the attribute data which corresponds to a block including two or more pixels neighboring each other, from the index data.

12. The apparatus according to claim 1, further comprising a setting unit configured to set index data for the input pixel in accordance with an image characteristic of an image area including one or more input pixels of the input image data, and store the index data in the memory.

13. The apparatus according to claim 12,
 wherein the setting unit divides the input image data into a plurality of data and stores the index data which corresponds to each divided data in the memory.

14. The apparatus according to claim 12,
wherein the setting unit sets an attribute value for each block including two or more pixels neighboring each other of the input image data.

15. The apparatus according to claim 12,
wherein the image characteristic of the image area includes at least one of a graphic area, a text area or a photo area.

16. The apparatus according to claim 1, further comprising a calculation unit configured to calculate a position of the corresponding index data based on the pixel position.

17. The apparatus according to claim 1,
wherein the processing unit selects one of a plurality of lookup tables in accordance with the attribute data obtained by the obtaining unit, and performs color conversion processing by using the selected lookup table.

18. The apparatus according to claim 1, wherein
the image data includes a plurality of pixel values, and
the processing unit is able to change the content of the image processing for each of the pixel values, based on the attribute data.

19. An image processing method, comprising:

determining, in a predetermined area of a memory, an area for holding attribute data and an area for holding index data to specify the attribute data;

obtaining attribute data which corresponds to an input pixel of input image data from the area for holding attribute data in the predetermined area of the memory, in accordance with index data which is specified based on a position of the input pixel; and performing image processing, based on the attribute data obtained in the obtaining step, to a pixel value of the input pixel, wherein, in the determining, assignment of the area for holding index data and the area for holding attribute data is determined in the predetermined area of the memory, in accordance with a content of the performed image processing to the pixel value of the input pixel.

* * * * *